United States Patent
Kumar et al.

(10) Patent No.: US 9,069,566 B1
(45) Date of Patent: Jun. 30, 2015

(54) IMPLEMENTATION OF A MULTIPLE WRITER SINGLE READER QUEUE IN A LOCK FREE AND A CONTENTION FREE MANNER

(75) Inventors: Arun Kumar, Bangalore (IN); Mehar Vln Simhadri, Bangalore (IN)

(73) Assignee: Hudku Technosoft Private Limited, Bangalore (IN)

( * ) Notice: Subject to any disclaimer, the term of this patent is extended or adjusted under 35 U.S.C. 154(b) by 186 days.

(21) Appl. No.: 13/401,857

(22) Filed: Feb. 22, 2012

(51) Int. Cl.
- *G06F 9/46* (2006.01)
- *G06F 9/38* (2006.01)
- *G06F 9/48* (2006.01)
- *G06F 9/54* (2006.01)

(52) U.S. Cl.
CPC ............ *G06F 9/3855* (2013.01); *G06F 9/4881* (2013.01); *G06F 9/546* (2013.01)

(58) Field of Classification Search
None
See application file for complete search history.

(56) References Cited

U.S. PATENT DOCUMENTS

| | | | | |
|---|---|---|---|---|
| 5,671,446 | A * | 9/1997 | Rakity et al. | 710/54 |
| 2002/0073082 | A1* | 6/2002 | Duvillier et al. | 707/3 |
| 2002/0103814 | A1* | 8/2002 | Duvillier et al. | 707/202 |
| 2004/0010499 | A1* | 1/2004 | Ghosh et al. | 707/100 |
| 2007/0067774 | A1* | 3/2007 | Kukanov et al. | 718/102 |
| 2007/0079061 | A1* | 4/2007 | Ogasawara | 711/112 |
| 2009/0031306 | A1* | 1/2009 | Yuen et al. | 718/100 |
| 2009/0133023 | A1* | 5/2009 | Li et al. | 718/102 |
| 2010/0241774 | A1* | 9/2010 | Olszewski et al. | 710/200 |
| 2010/0275209 | A1* | 10/2010 | Detlefs | 718/102 |
| 2010/0293553 | A1* | 11/2010 | Kukanov et al. | 718/108 |
| 2012/0131038 | A1* | 5/2012 | Aronovich et al. | 707/769 |

* cited by examiner

*Primary Examiner* — Adam Lee
(74) *Attorney, Agent, or Firm* — Evergreen Valley Law Group; Kanika Radhakrishnan

(57) ABSTRACT

Method and system for implementing a multiple writer single reader queue in a lock free and a contention free manner. The method includes receiving a plurality of payloads from a plurality of users, assigning each payload to a writer thread, creating a corresponding writer queue by each the writer threads, enqueuing queue entries into the writer queues maintained exclusively by the each of the writer threads and dequeuing sequentially the queue entries by a reader thread. Further, the method includes adding and removing one or more writer threads in real time. The system includes an electronic device for displaying a plurality of payloads. The system also includes a processor, a memory that stores instructions and a communication interface in electronic communication with the electronic device and the processor.

26 Claims, 23 Drawing Sheets

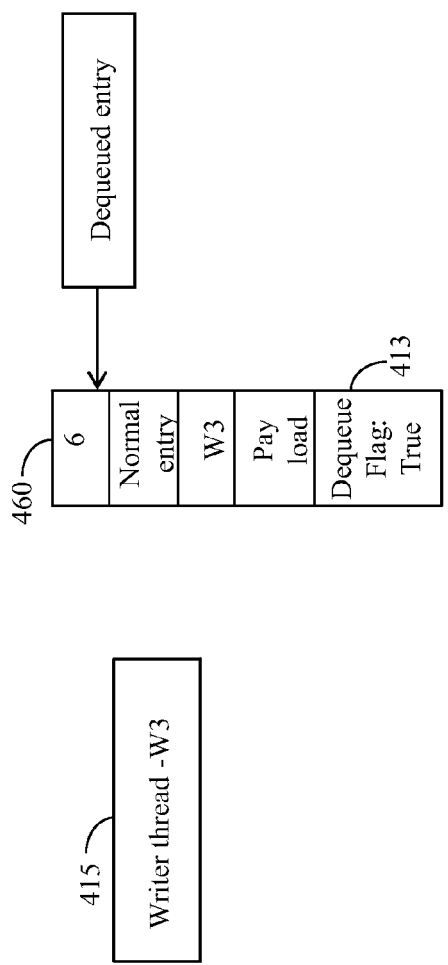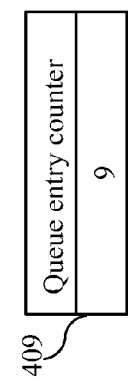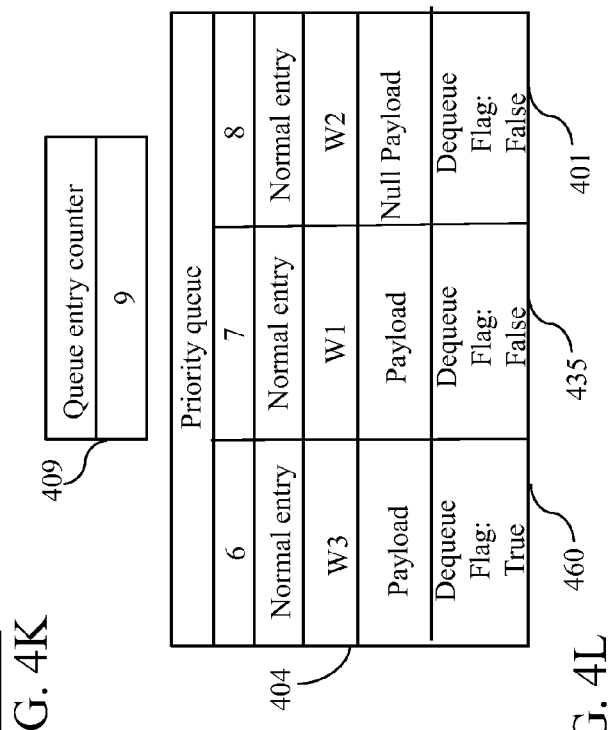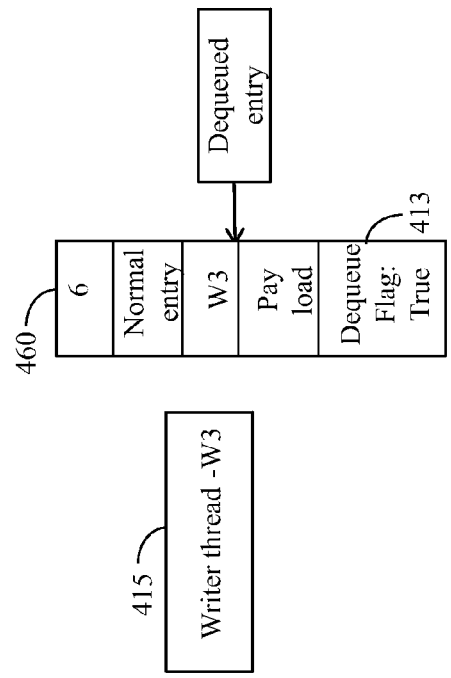
FIG. 4K
FIG. 4L

IMPLEMENTATION OF A MULTIPLE WRITER SINGLE READER QUEUE IN A LOCK FREE AND A CONTENTION FREE MANNER

TECHNICAL FIELD

Embodiments of the disclosure relate to the field of implementing a multiple writer single reader queue in a lock free and a contention free manner.

BACKGROUND

Queues are widely used for buffering or storing data. Examples of the data can include, but are not limited to, program instructions that require execution, web queries, and computer applications. A queue can be accessed by multiple processes. The processes can also be referred to as threads. One such example of the queue is a first in, first out (FIFO) queue where a writer thread inserts the data into the FIFO queue. A reader thread subsequently retrieves the data from the FIFO queue. The data is inserted at a tail end of the FIFO queue and the data is retrieved from a head end of the FIFO queue. Further, process of inserting data into the FIFO queue is referred to as enqueuing and the process of retrieving data from the FIFO queue is referred to as dequeuing. The data retrieved by the reader thread is transmitted for further processing.

Multiple writer threads try to insert multiple data into the FIFO queue simultaneously. In such a case, the multiple data is overwritten in the FIFO queue resulting in loss of the data prior to processing. One method to overcome the above limitation is to employ a hard lock to the FIFO queue. The hard lock ensures merely one writer thread or one reader thread for enqueuing or dequeuing respectively at one time instant. In one example, a first writer thread can obtain the hard lock and insert the data into the FIFO queue. While the first writer thread, possesses the hard lock, other writer threads or the reader thread are unable to access the FIFO queue at that time instant. Further, the writer threads except the first writer thread possessing the hard lock are put to sleep mode. Upon inserting the data into the FIFO queue, the first writer thread releases the hard lock. The hard lock thus released is then possessed by one of the other writer threads or the reader thread to enter data into the FIFO queue or to retrieve the data from the FIFO queue respectively. Further, the writer threads and the reader thread are forced to wait until acquiring the hard lock to enqueue the data and to dequeue the data respectively. Furthermore, using the hard locks for implementing the FIFO queue requires a call to a kernel of an operating system (OS) which is expensive in terms of central processing unit (CPU) cycle usage.

In another queue implementation a soft lock is used while inserting the data into the FIFO queue. The soft lock can be implemented using software objects or software functions. One or more writer threads can attempt to enqueue the data simultaneously. Further, one or more reader threads can also attempt to dequeue the data simultaneously. In such cases, the writer threads and reader threads may attempt to access the priority queue simultaneously. In soft locks, an atomic operation is implemented to ensure that a single writer thread or a reader thread is capable of accessing the priority queue at one time instant. In one example, a current writer thread wishes to modify the FIFO queue by inserting a data into the FIFO queue. Prior to modifying, the current writer thread stores a current state entry value of the FIFO queue and further the current writer thread performs necessary processing of the data. The current writer thread upon processing, checks the current state entry value of the FIFO queue over again. A compare and swap operation (CAS) is performed to check the current state entry value of the FIFO queue. If the current state entry value is not modified then the current writer thread can insert the data into the FIFO queue. Further, if the current state entry value has been modified then CAS would fail and hence the current writer thread cannot modify the FIFO queue. Thus, the current writer thread is required to repeat the processing of the data and further perform the CAS to determine if the current state entry value has been modified. When there is a contention between multiple writer threads to insert the data into the FIFO queue, while one writer thread succeeds and is under the process of inserting the data into the FIFO queue, the other writer threads would be continuously looping using an atomic operation primitive, to detect that the FIFO queue is not under modification and hence can gain access to the FIFO queue for inserting the data. Further, the reader thread can also dequeue the data from the priority queue, however it is not contention free. Although use of the soft lock provides a lock free implementation, valuable CPU cycles are used unnecessarily for merely re-performing the operations mentioned above. Further, one of the writer threads could get starved and the writer thread that gets starved might end up executing the atomic operation primitive indefinitely.

In the light of the foregoing discussion there is a need for a method and a system for implementing the FIFO queue in a lock free and contention free manner.

SUMMARY

The above-mentioned needs are met by a method, a computer program product and a system for implementing a multiple writer single reader queue in a lock free and a contention free manner.

An example of a method of implementing a multiple writer single reader queue in a lock free and a contention free manner includes receiving a plurality of payloads from a plurality of users. The method also includes assigning a first payload of the plurality of payloads to a first writer thread of a plurality of writer threads and a second payload of the plurality of payloads to a second writer thread of the plurality of writer threads. The first writer thread and the second writer thread are included in a writer list. The method further includes creating a first writer queue by the first writer thread exclusively owned by the first writer thread and a second writer queue by the second writer thread exclusively owned by the second writer thread. Further, the method includes enqueuing a first queue entry into the first writer queue by the first writer thread and a second queue entry into the second writer queue by the second writer thread. Moreover, the method includes dequeuing sequentially the first queue entry from the first writer queue and the second queue entry from the second writer queue by a reader thread. The first queue entry and the second queue entry are inserted into a sorted queue.

An example of a computer program product stored on a non-transitory computer-readable medium that when executed by a processor, performs a method of implementing a multiple writer single reader queue in a lock free and a contention free manner. The computer program product includes receiving a plurality of payloads from a plurality of users. The computer program product also includes assigning a first payload of the plurality of payloads to a first writer thread of a plurality of writer threads and a second payload of the plurality of payloads to a second writer thread of the plurality of writer threads. The first writer thread and the second writer thread are included in a writer list. The computer program product further includes creating a first writer queue by the first writer thread exclusively owned by the first writer thread and a second writer queue by the second writer thread exclusively owned by the second writer thread. Further, the computer program product includes enqueuing a first queue entry into the first writer queue by the first writer thread and a second queue entry into the second writer queue by the second writer thread. Moreover, the computer program product also includes dequeuing sequentially the first queue entry from the first writer queue and the second queue entry from the second writer queue by a reader thread. The first queue entry and the second queue entry are inserted into a sorted queue.

An example of a system for implementing a multiple writer single reader queue in a lock free and a contention free manner includes an electronic device for displaying a plurality of payloads. The system also includes a processor responsive to the instructions to receive the plurality of payloads from a plurality of users, assign a first payload of the plurality of payloads to a first writer thread of a plurality of writer threads and a second payload of the plurality of payloads to a second writer thread of the plurality of writer threads, create a first writer queue by the first writer thread and a second writer queue by the second writer thread, enqueue a first queue entry into the first writer queue by the first writer thread and a second queue entry into the second writer queue by the second writer thread and dequeue sequentially the first queue entry from the first writer queue and the second queue entry from the second writer queue by the reader thread. The first queue entry and the second queue entry are inserted into a sorted queue. The system further includes a memory that stores instructions. Further, the system includes a communication interface in electronic communication with the electronic device and the processor.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the present disclosure.

DETAILED DESCRIPTION OF THE EMBODIMENTS

The above-mentioned needs are met by a method, computer program product and system for implementing a multiple writer single reader queue (MWSR) in a lock free and a contention free manner. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
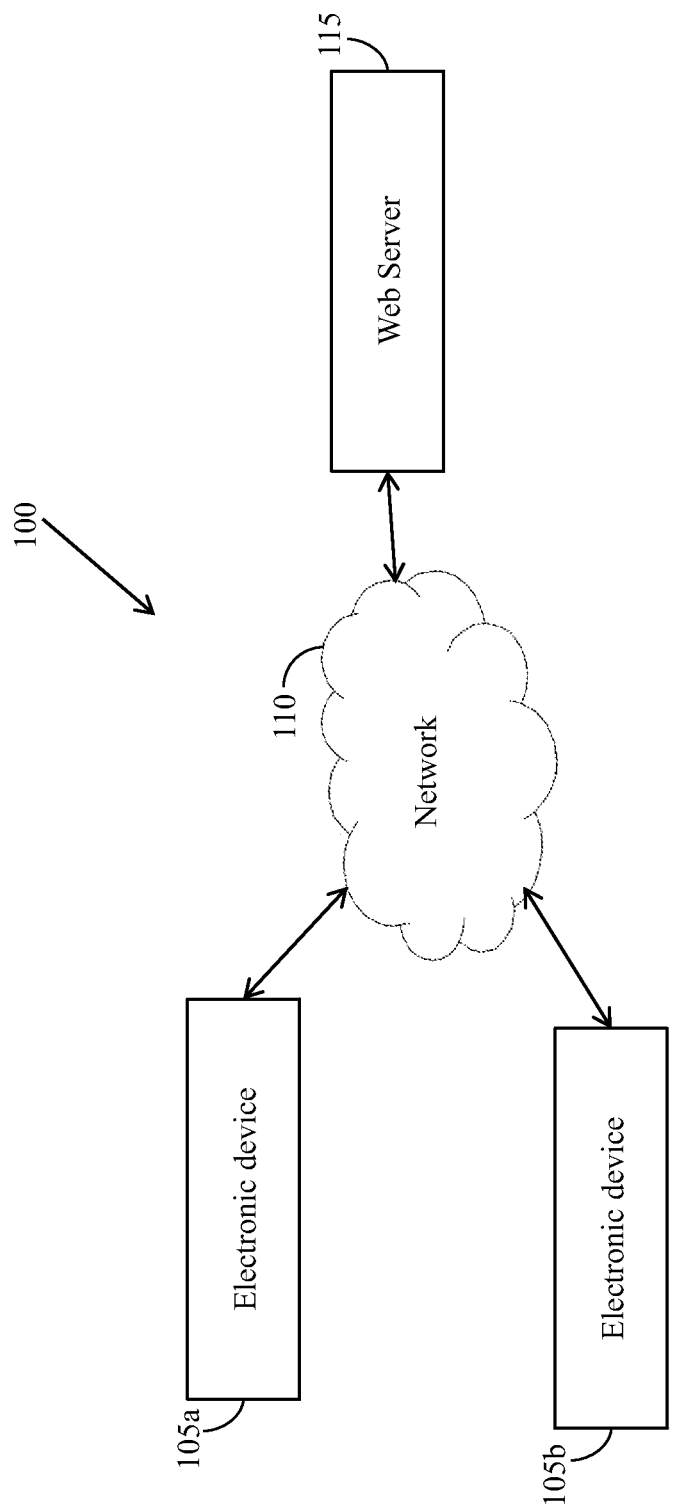
FIG. 1 is a block diagram of an environment, in accordance with which various embodiments can be implemented.

FIG. 1 is a block diagram of an environment 100, in accordance with which various embodiments can be implemented.

The environment 100 includes a web server 115. The environment 100 further includes one or more electronic devices, for example an electronic device 105a and an electronic device 105b, which can communicate with the web server 115 through a network 110. The web server 115 can be located remotely with respect to the electronic devices. Examples of the electronic devices include, but are not limited to, computers, mobile devices, laptops, palmtops, hand held devices, telecommunication devices, smart phones and personal digital assistants (PDAs). Examples of the network 110 include, but are not limited to, a Local Area Network (LAN), a Wireless Local Area Network (WLAN), a Wide Area Network (WAN), internet, and a Small Area Network (SAN).

Websites are associated with a corresponding web server, for example, the web server 115, for processing various requests of the users. When a user accesses an html page of a website, IP address of the user is logged into a log file. Further, date and time of accessing the html page by the user can also be logged into the log file. In case of search engines, the search queries typed by the users on the websites are usually logged into a log file. The search query, along with date and time of typing the search query, can be logged into the log file. The log file is used to keep a record of the search queries of the users by the websites for flexible processing. The multiple users accessing the html page of the website can also be logged into the log file.

At a given instant if the web server 115 is a search engine, then the web server 115 services multiple search queries. In such a case, the web server 115 creates multiple writer threads for servicing the search queries. The writer threads can also be obtained from a web server pool for servicing the search queries. The writer threads are defined as software processes that are executed by an operating system (OS). One writer thread services only one search query of the search queries. Servicing includes processing the search queries and further displaying a search result associated with the search queries.

Upon creating the writer threads, the web server 115 assigns the search queries to corresponding writer threads to service the search queries. Upon servicing, one or more search results responsive to the search queries are provided to the user. Further, each of the writer threads logs the search queries into a log file. Each of the writer threads creates a corresponding writer queue for logging the search queries into the log file. One or more queue entries including the search queries are inserted into the corresponding writer queue. Upon inserting, the writer threads become available for servicing other search queries.

The search queries present in the corresponding writer queues are retrieved by a reader thread. The reader thread is defined as a software process that is executed by the OS for further processing of the search queries. In one example, the further processing can include, but not limited to, writing the retrieved search queries into the log file. The reader thread employs a sorted queue for retrieving the search queries from multiple writer threads in a sorted order. In one embodiment, a priority queue can be used for retrieving the search queries from multiple writer threads in a sorted order. The multiple search queries are retrieved in a first-in-first-out (FIFO) order from the priority queue. The process of inserting the search queries into the corresponding writer queues and retrieving the search queries from the priority queue is combined together to form an MWSR queue.

Figure 2:
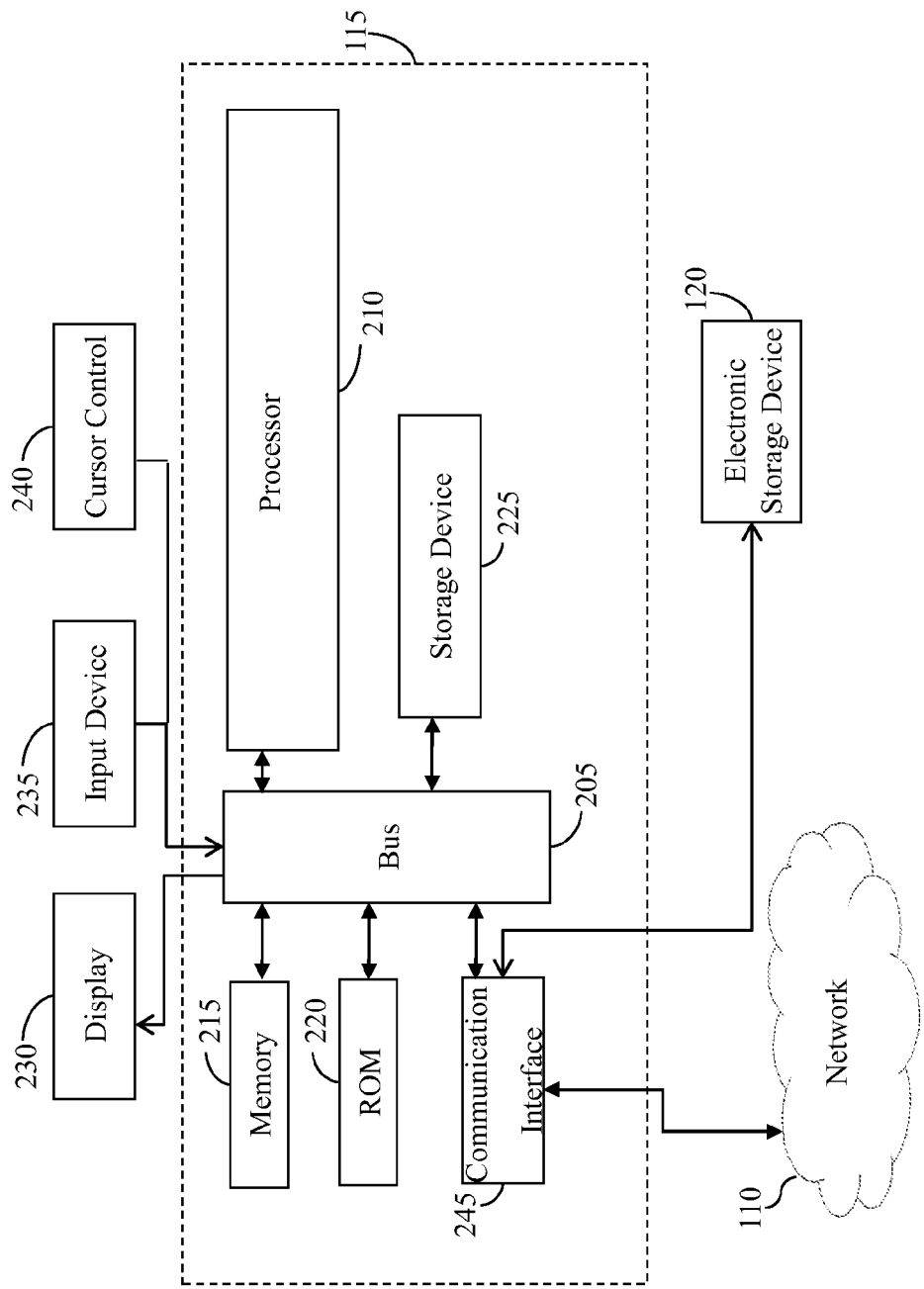
FIG. 2 is a block diagram of a web server for implementing a multiple writer single reader queue in a lock free and a contention free manner, in accordance with one embodiment.

FIG. 2 is a block diagram of a web server, for example the web server 115, for implementing the MWSR queue in a lock free and a contention free manner, in accordance with one embodiment.

The web server 115 includes a bus 205 or other communication mechanism for communicating information, and a processor 210 coupled with the bus 205 for processing information. The web server 115 also includes a memory 215, for example a random access memory (RAM) or other dynamic storage device, coupled to the bus 205 for storing information and instructions to be executed by the processor 210. The memory 215 can be used for storing temporary variables or other intermediate information during execution of instructions by the processor 210. The web server 115 further includes a read only memory (ROM) 220 or other static storage device coupled to the bus 205 for storing static information and instructions for the processor 210. A storage device 225, for example a magnetic disk or optical disk, is provided and coupled to the bus 205 for storing information, for example information associated with a search query.

The web server 115 can be coupled via the bus 205 to a display 230, for example a cathode ray tube (CRT), for displaying a search result responsive to a search query of a user. The input device 235, including alphanumeric and other keys, is coupled to the bus 205 for communicating information and command selections to the processor 210. Another type of user input device is the cursor control 240, for example a mouse, a trackball, or cursor direction keys for communicating direction information and command selections to the processor 210 and for controlling cursor movement on the display 230.

Various embodiments are related to the use of the web server 115 for implementing the techniques described herein. In some embodiments, the techniques are performed by the web server 115 in response to the processor 210 executing instructions included in the memory 215. Such instructions can be read into the memory 215 from another machine-readable medium, for example the storage device 225. Execution of the instructions included in the memory 215 causes the processor 210 to perform the process steps described herein.

In some embodiments, the processor 210 can include one or more processing units for performing one or more functions of the processor 210. The processing units are hardware circuitry used in place of or in combination with software instructions to perform specified functions.

The term "machine-readable medium" as used herein refers to any medium that participates in providing data that causes a machine to perform a specific function. In an embodiment implemented using the web server 115, various machine-readable media are involved, for example, in providing instructions to the processor 210 for execution. The machine-readable medium can be a storage medium, either volatile or non-volatile. A volatile medium includes, for example, dynamic memory, for example the memory 215. A non-volatile medium includes, for example, optical or magnetic disks, for example the storage device 225. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic media, a CD-ROM, any other optical media, punchcards, papertape, any other physical media with patterns of holes, a RAM, a PROM, and EPROM, a FLASH-EPROM, any other memory chip or cartridge.

In another embodiment, the machine-readable media can be transmission media including coaxial cables, copper wire and fiber optics, including the wires that comprise the bus 205. Transmission media can also take the form of acoustic or light waves, such as those generated during radio-wave and infra-red data communications. Examples of machine-readable media may include, but are not limited to, a carrier wave as described hereinafter or any other media from which the web server 115 can read. For example, the instructions can initially be carried on a magnetic disk of a remote computer. The remote computer can load the instructions into its dynamic memory and send the instructions over a telephone line using a modem. A modem local to the web server 115 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on the storage device 225 either before or after execution by the processor 210. All such media must be tangible to enable the instructions carried by the media to be detected by a physical mechanism that reads the instructions into a machine.

The web server 115 also includes a communication interface 245 coupled to the bus 205. The communication interface 245 provides a two-way data communication coupling to the network 110. For example, the communication interface 245 can be an integrated services digital network (ISDN) card or a modem to provide a data communication connection to a corresponding type of telephone line. As another example, the communication interface 245 can be a local area network (LAN) card to provide a data communication connection to a compatible LAN. In any such implementation, the communication interface 245 sends and receives electrical, electromagnetic or optical signals that carry digital data streams representing various types of information.

The processor 210 in the web server 115 receives multiple payloads from multiple users. The processor 210 then assigns a first payload to a first writer thread and a second payload to a second writer thread. Similarly, the processor 210 exclusively assigns each writer thread to one payload of the payloads. The processor 210 further provides instructions to create a first writer queue by the first writer thread and a second writer queue by the second writer thread. The first writer thread then enqueues a first queue entry into the first writer queue and the second writer thread enqueues a second queue entry into the second writer queue. Similarly, each writer thread enqueues a corresponding queue entry into a corresponding writer queue. Upon enqueuing, the processor 210 further provides instructions to a reader thread for dequeuing sequentially the first queue entry from the first writer queue and the second queue entry from the second writer queue. Likewise, the reader thread dequeues the corresponding queue entry from the corresponding writer queue of each writer thread. Furthermore, the processor 210 provides instructions to a reader thread for inserting the first queue entry and the second queue entry into a priority queue. In some embodiments, the processor 210 creates the writer threads and the reader thread.

Figure 3A:
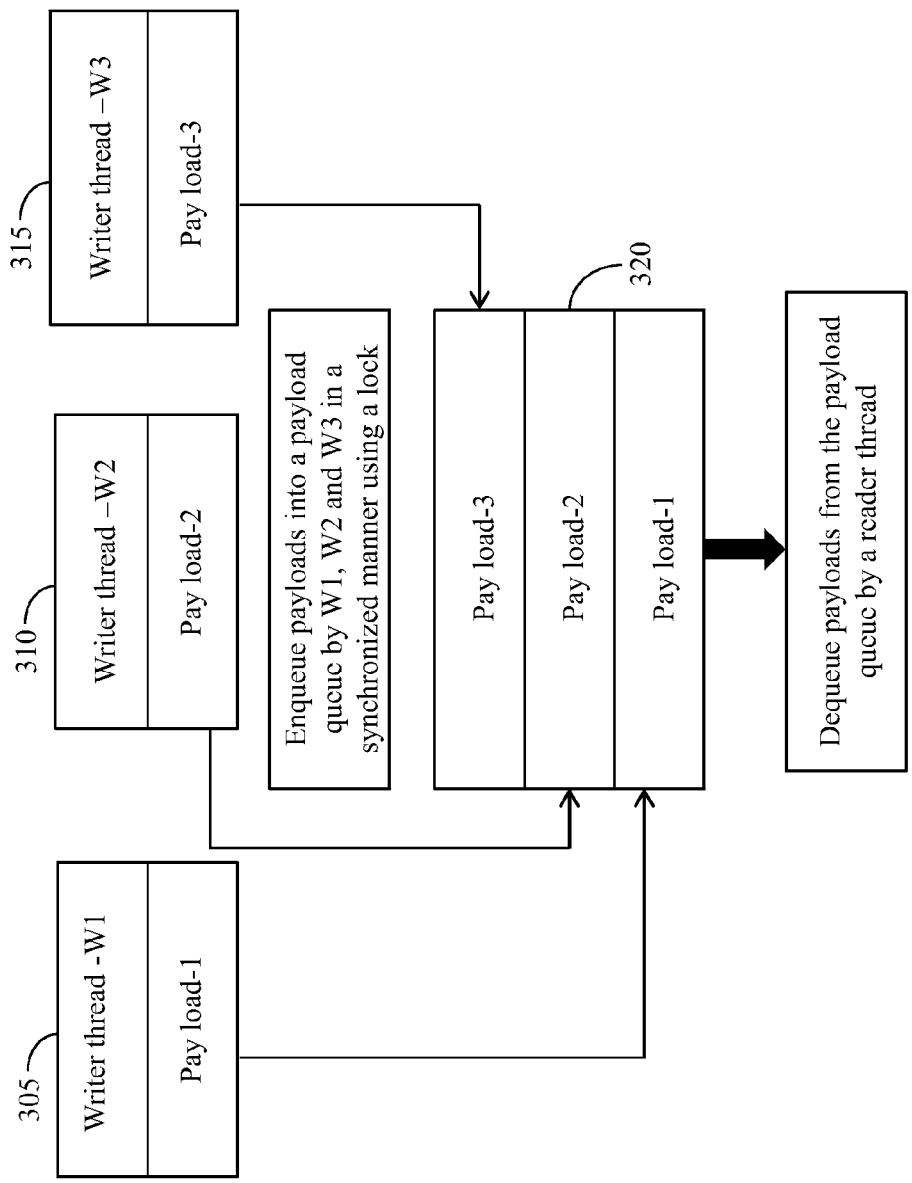
FIG. 3A is a schematic representation of a queue implementation, in accordance with one prior art.

FIG. 3A is a schematic representation of a queue implementation, in accordance with one prior art.

FIG. 3A includes a writer thread W1 305, a writer thread W2 310 and a writer thread W3 315. The writer thread W1 305 holds a payload-1, the writer thread W2 310 holds a payload-2 and the writer thread W3 315 holds a payload-3. Each writer thread enqueues associated payload into a payload queue 320. A lock is used for enqueuing the associated payload, by each writer thread, into the payload queue 320. The writer thread possessing the lock gains access to the payload queue 320. Upon gaining the access, the writer thread enqueues the associated payload into the payload queue 320. Hence, a contention exists among the writer threads for enqueuing the associated payloads into the payload queue 320.

Each writer thread, upon enqueuing the corresponding payload into the payload queue 320, is dequeued, by a reader thread, in a FIFO order. The payloads dequeued from the payload queue 320 is transmitted for further processing. In one example, the payloads dequeued can represent search queries that requires to be logged into a log file.

Figure 3B:
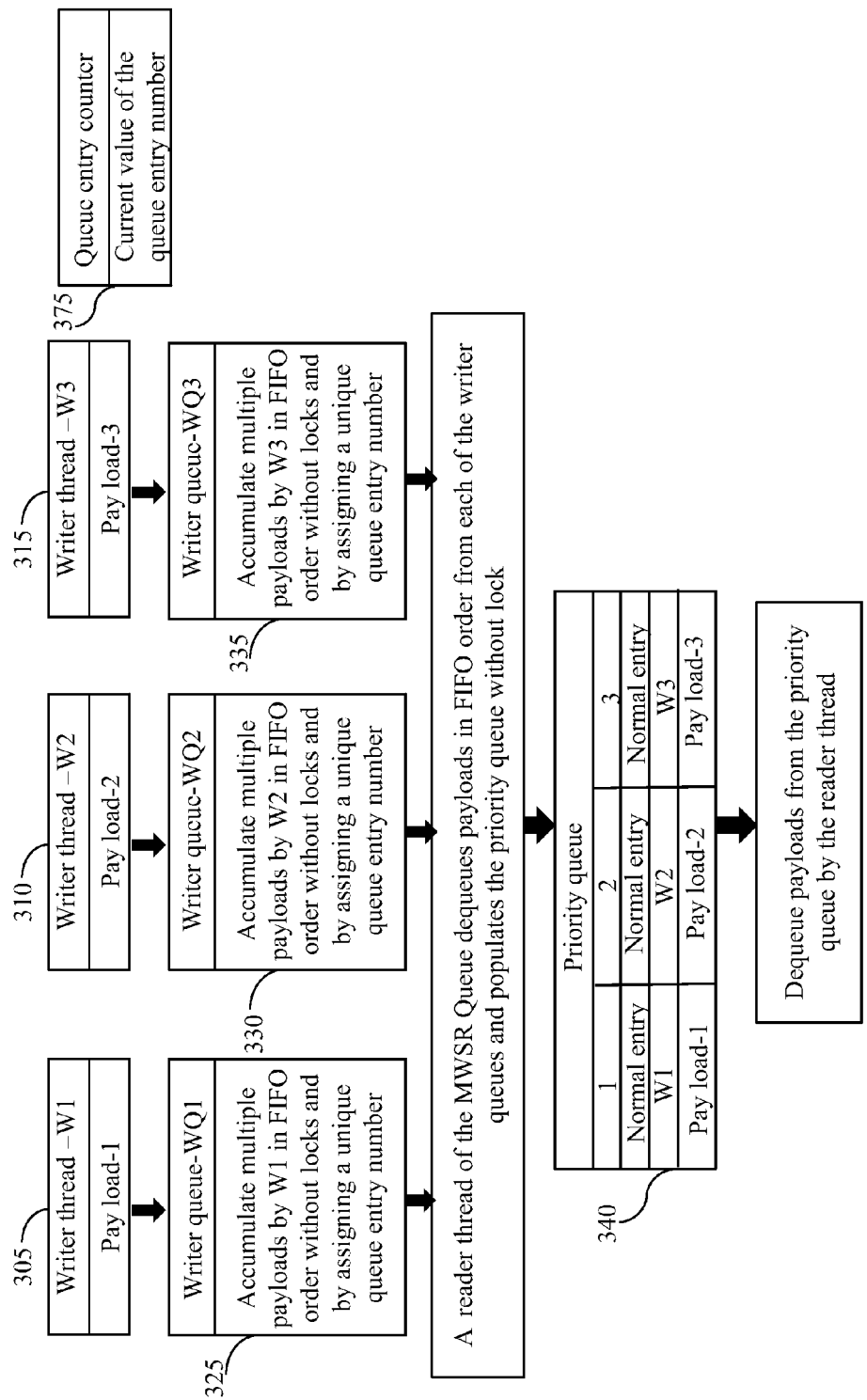
FIG. 3B is a schematic representation of a multiple writer single reader queue in a lock free and a contention free manner, in accordance with one embodiment.

FIG. 3B is a schematic representation of a multiple writer single reader queue in a lock free and a contention free manner, in accordance with one embodiment FIG. 3B includes the writer thread W1 305, the writer thread W2 310 and the writer thread W3 315. The writer thread W1 305 holds the payload-1, the writer thread W2 310 holds the payload-2 and the writer thread W3 315 holds the payload-3. The writer thread W1 305 creates a writer queue WQ1 325, the writer thread W2 310 creates a writer queue WQ2 330 and the writer thread W3 315 creates a writer queue WQ3 335.

The writer queue WQ1 325 is exclusively owned by the writer thread W1 305. Further, the writer thread W1 305 is associated with multiple payloads. Each of the multiple payloads associated with the writer thread W1 305 writer thread W1 305 is assigned a unique queue entry number. The writer thread W1 305, upon assigning, enqueues the multiple payloads into the writer queue WQ1 325 in FIFO order. Further, a lock is not required for enqueuing. Similarly, the writer queue WQ2 330 is exclusively owned by the writer thread W2 310. Multiple payloads associated with the writer thread W2 310 is enqueued into the writer queue WQ2 330 in the FIFO order without using the lock. Likewise, the writer thread W3 315 exclusively owns the writer queue WQ3 335. Multiple payloads associated with the writer thread W3 315 is enqueued into the writer queue WQ3 335 in the FIFO order without using the lock. A queue entry counter 375 is used to provide a unique queue entry number to each of the queue entries. The process of enqueuing payloads by the writer threads is explained in detail in conjunction with FIG. 3C.

Upon enqueuing, a reader thread dequeues the payloads present in each writer queue. The payloads from each writer queue are dequeued in the FIFO order of the queue entry number assigned by each writer thread to each payload. Further, at one instant, the reader thread dequeues a single payload from one of the writer threads. The payloads dequeued by the reader thread is inserted into a priority queue 340 in the FIFO order. The priority queue 340 is maintained by the reader thread. Upon inserting, the payloads from the priority queue 340 are retrieved to be transmitted for further processing. The dequeuing process, by the reader thread, is explained in detail in conjunction with FIG. 6A-6D.

Figure 3C:
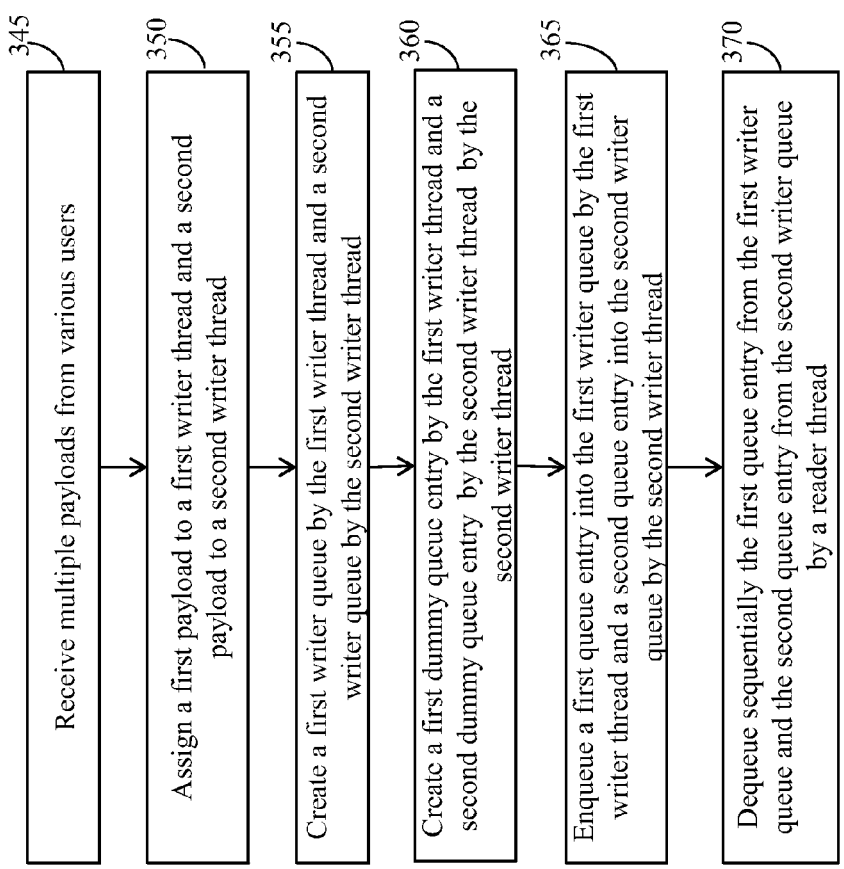
FIG. 3C is a flow diagram illustrating a method of implementing a multiple writer single reader queue in a lock free and a contention free manner, in accordance with one embodiment.

FIG. 3C is a flow diagram illustrating a method of implementing a multiple writer single reader queue in a lock free and a contention free manner, in accordance with one embodiment.

At step 345, a plurality of payloads is received from a plurality of users. In one example, the payloads can include a web search query of a user. In another example, the payloads can also include a set of instructions to be executed by a processor. In yet another example, the payloads can include access information of html pages of various websites that are required to be logged.

At step 350, the first payload is assigned to a first writer thread and the second payload is assigned to a second writer thread. Similarly, each of the payloads is assigned to a corresponding writer thread. Hence, multiple writer threads are created. Each writer thread is associated with a writer reference. The writer reference is used for identifying the writer thread. The writer reference, in one example, can include an alphanumeric value. Each writer thread, processes assigned payload. The writer threads are obtained from a web server pool and further added to a writer list. Hence, the writer list maintains a list of the writer threads to be recognized by a reader thread subsequently. Number of writer threads present in the web server pool is based on an OS capability of a web server, for example the web server 115.

In some embodiments, at any given instant one or more writer threads can be created in the web server pool and can be added to the writer list. Further, one or more writer threads can be discarded when the writer threads are no longer used for processing the payloads.

At step 355, a first writer queue is created by the first writer thread and a second writer queue is created by the second writer thread. The first writer thread exclusively owns the first writer queue and the second writer thread exclusively owns the second writer queue. Likewise, each writer thread creates a corresponding writer queue. Further, each writer thread exclusively owns the corresponding writer queue. Instructions are used for creating the corresponding writer queue by each writer thread. The writer queue, in one example, can include a simple singly linked list. Multiple queue entries can be inserted at a tail end of the writer queue and retrieved from a head end of the writer queue. One or more techniques can be used for identifying the tail end and the head end of the writer queue. In one example, a tail index and a head index can be used for identifying the tail end and the head end respectively.

The writer queue is used to store the payloads associated with each writer thread. A single writer thread can store multiple payloads into its writer queue. Each writer thread enqueues the assigned payloads into the tail end of the corresponding writer queue, thereby storing the payloads in an order of processing.

At step 360, a first dummy entry is created by the first writer thread and a second dummy entry is created by the second writer thread. The first dummy entry includes a queue entry number, an entry type as a dummy entry, a writer reference associated with the first writer thread and a null payload. The second dummy entry includes a queue entry number, the entry type as the dummy entry, a writer reference associated with the second writer thread and a null payload. The first dummy entry and the second dummy entry are inserted into the first writer queue and the second writer queue respectively. Similarly, each of the writer threads creates corresponding dummy entries and inserts the corresponding dummy entries into the corresponding writer queues. The dummy entries of each of the writer threads include a null payload. The dummy entries, from the corresponding writer queues, are retrieved by the reader thread subsequently. The entry number associated with the dummy entries enable the reader thread to recognize the first writer thread and a second writer thread at appropriate time.

At step 365, a first queue entry is enqueued into the first writer queue by the first writer thread and a second queue entry is enqueued into the second writer queue by the second writer thread. Similarly, corresponding queue entries are enqueued by each of the writer threads into each of the corresponding writer queues. The first queue entry is inserted at a tail end of the first writer queue and the second queue entry is inserted at a tail end of the second writer queue. One or more instructions can be used for enqueuing the queue entries into the corresponding writer queues by each of the writer threads. The queue entries can be inserted at the tail end of the writer queues. The number of queue entries that can be enqueued by a writer thread into the corresponding writer queue is based on the capability of the OS.

In one example, the first queue entry is assigned a first queue entry number and the second queue entry is assigned a second queue entry number. Similarly, each of the queue entries are exclusively assigned a queue entry number. The queue entry number assigned to each of the queue entries, is used to identify the order of the queue entries, to maintain a FIFO order. The queue entry numbers, for the queue entries, include sequential atomic integers that are incremented for every queue entry. Incrementing the queue entry number for assigning to the queue entries is regarded as an atomic operation. A queue entry counter is used to assign the queue entry numbers to each of the queue entries. Further, the first queue entry and the second queue entry are associated with an entry type. The entry type includes a normal entry, a dummy entry or a remove writer entry. A queue entry including the entry type as the normal entry indicates that the queue entry consists of a payload. A queue entry including the entry type as the dummy entry or the remove writer entry indicates the absence of a payload and further indicates a specific process is required to be performed subsequently. The queue entry counter is incremented by one every time the queue entry including the entry type as normal entry is added into the writer queue. However, the queue entry counter is not incremented when the queue entry includes the entry type as the dummy entry or the remove writer entry. The queue entry number is further used to represent a reference to each of the queue entries. Furthermore, the queue entry number is used to process the queue entries in a FIFO order. In one example, the first queue entry is inserted into the first writer queue and the second queue entry is inserted into the second writer queue. In such a case, the first queue entry is assigned 1 as the first queue entry number and the second queue entry is assigned 2 as the second queue entry number.

In one example, the first queue entry includes a first queue entry number, an entry type, the first payload and a writer reference associated with the first payload. Similarly, the second queue entry is associated with a second queue entry number, the entry type, the second payload and a writer reference associated with the second payload. Similarly, each queue entry includes corresponding queue entry number, the entry type, corresponding payload and the writer reference. The entry type is defined as a variable to store a normal entry or a dummy entry or a remove writer entry.

If the queue entry includes the entry type as the normal entry then the queue entry is regarded to possess a payload.

Further, if the queue entry includes the entry type as the dummy entry then the queue entry excludes a payload. However, the queue entry including the entry type as the dummy entry is used to maintain a reference to the writer thread associated with the queue entry. Hence, the queue entry including the entry type as the dummy entry can be used to maintain the writer reference associated with the queue entry such that the writer thread can be recognized by a reader thread regardless of absence of the payload. Further, the entry number associated with the dummy entry is used by the reader thread for polling the corresponding writer queue at appropriate time regardless of the absence of the payload for the writer thread. Also, when a new writer thread is created, a corresponding queue entry with the entry type being the dummy entry is inserted into a corresponding writer queue of the new writer thread.

Furthermore, if the queue entry includes the entry type as the remove writer entry then the queue entry bearing the entry type as the remove writer entry is removed from a priority queue maintained by the reader thread and discarded by the reader thread. Thereby, the reader thread derecognizes the writer thread and furthers stops polling the writer queue of the writer thread.

At step 370, the first queue entry bearing the first queue entry number from the first writer queue and the second queue entry bearing the second queue entry number from the second writer queue are dequeued sequentially by the reader thread. The first queue entry and the second queue entry that are dequeued by the reader thread are inserted into the priority queue maintained by the reader thread. Similarly, queue entries from each of the corresponding writer queues as mentioned in step 325 are dequeued sequentially based on the corresponding queue entry numbers and inserted into the priority queue. Instructions may be used for dequeuing the corresponding queue entries from the corresponding writer queues. The first queue entry is dequeued from a head end of the first writer queue and the second queue entry is dequeued from a head end of the second writer queue. Likewise, each of the queue entries are dequeued from the corresponding heads of the writer queues. Further, the priority queue includes queue entries associated with each of the active writer threads.

Figure 4A:
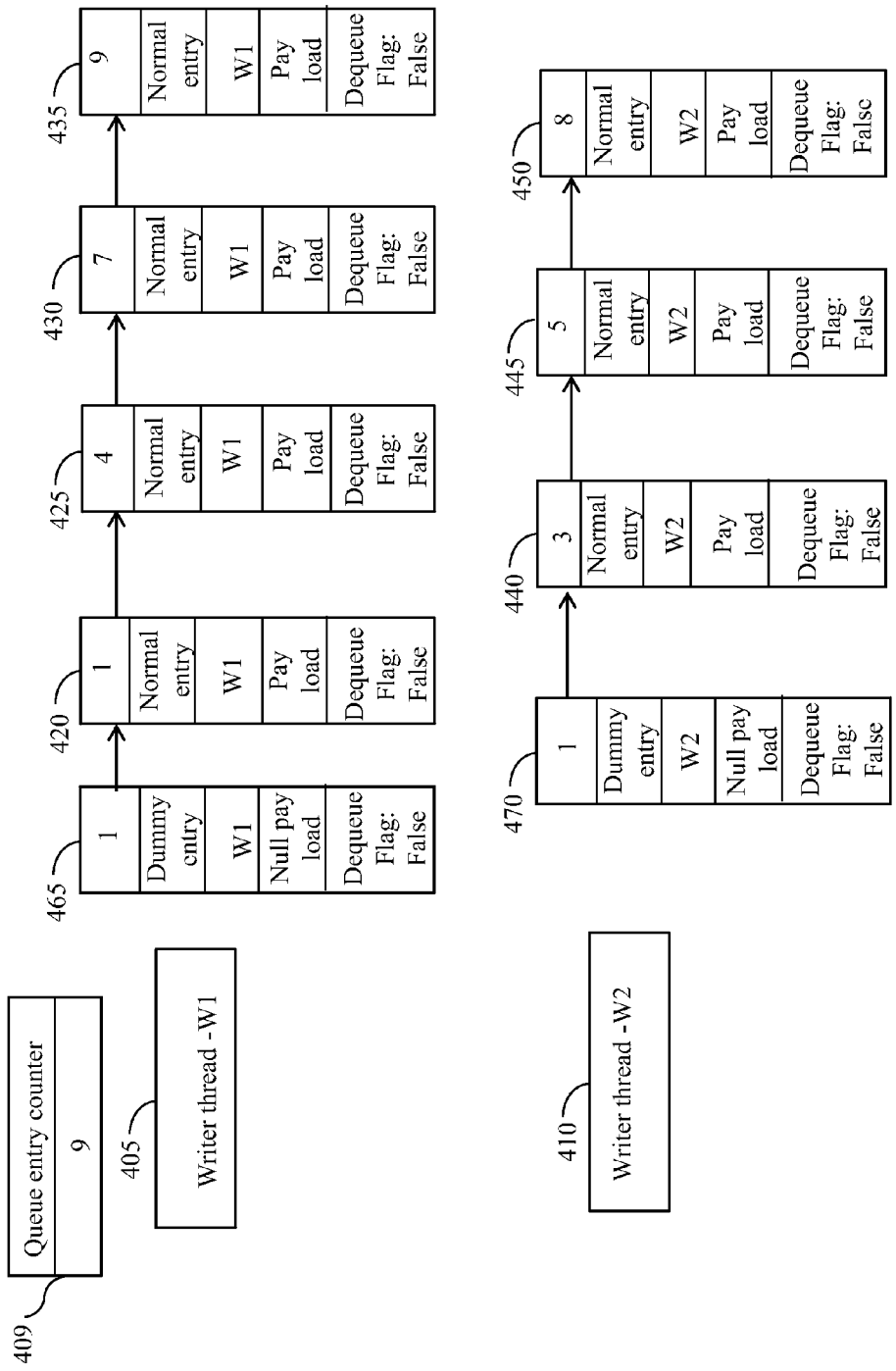
FIGS. 4A-4P illustrate exemplary views of implementing a multiple writer single reader queue in a lock free and a contention free manner, in accordance with one embodiment.
Figure 4B:
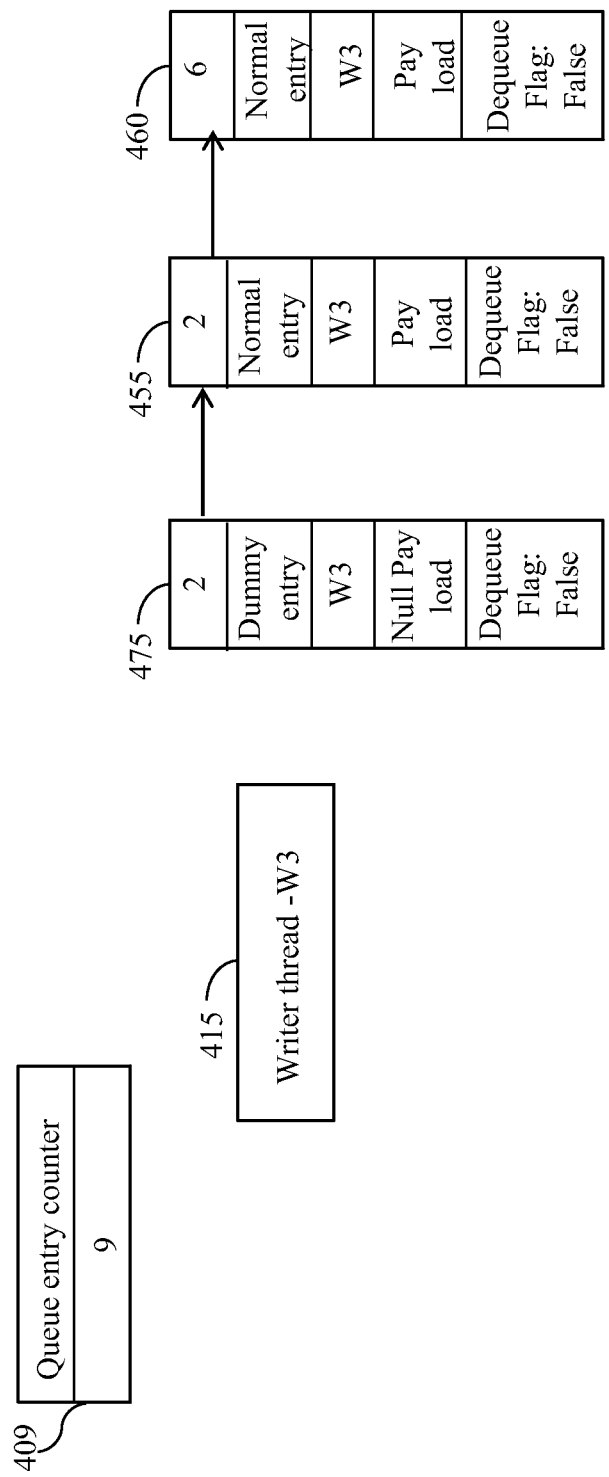
Figure 4C:
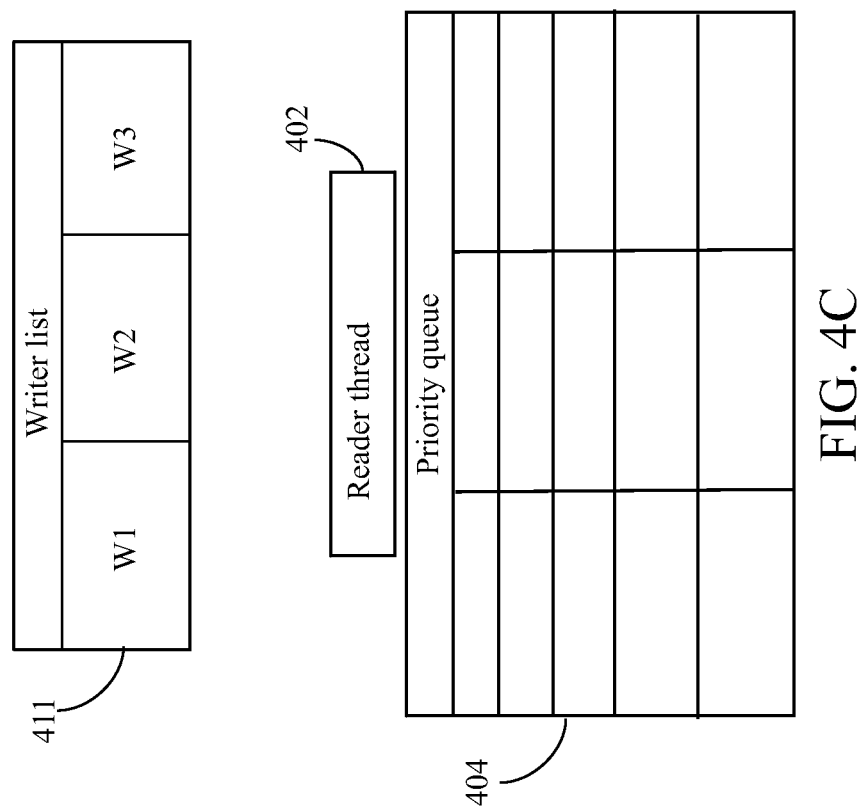
Figure 4D:
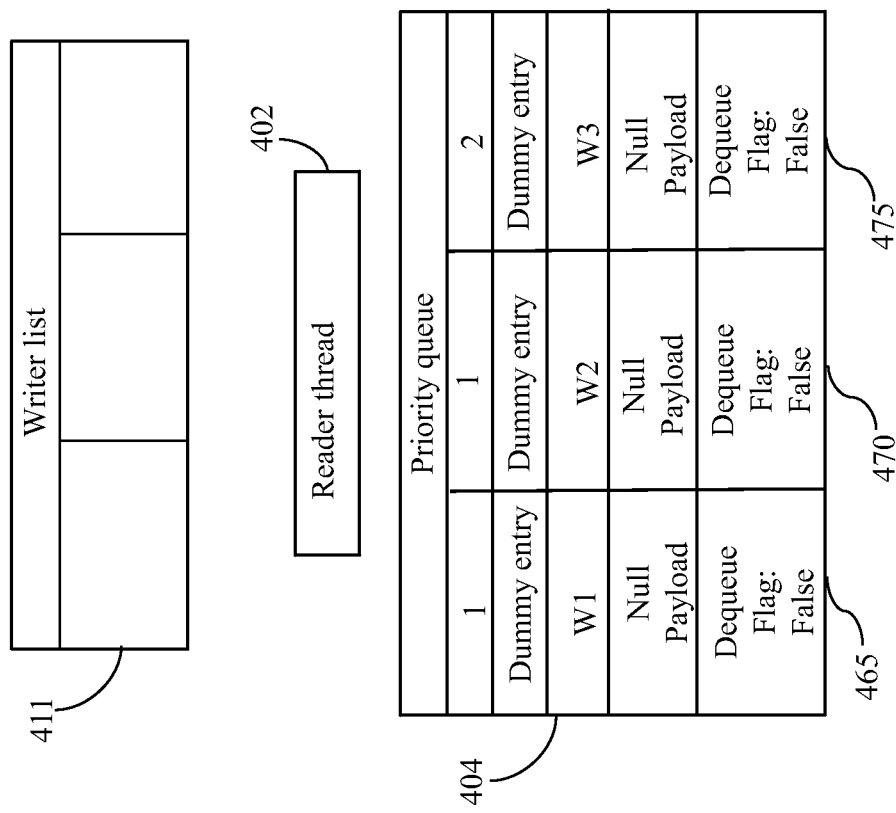
Figure 4E:
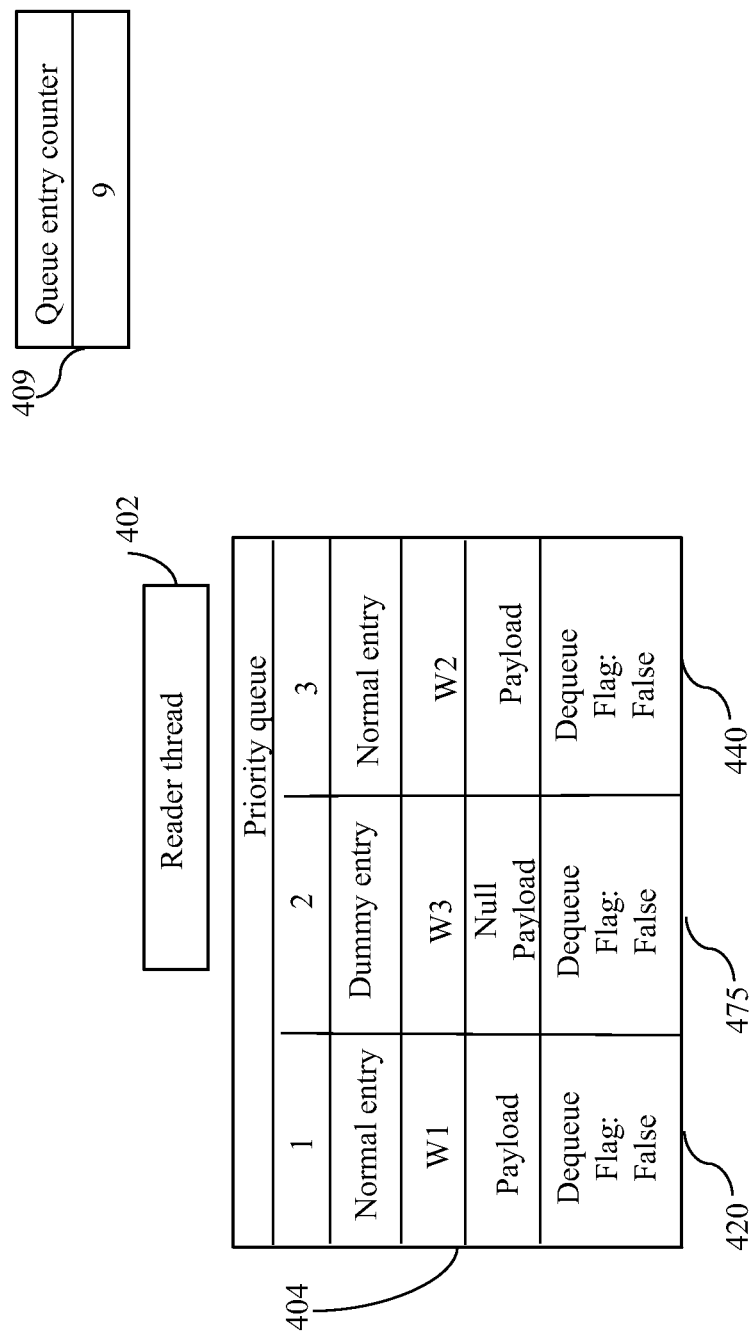
Figure 4F:
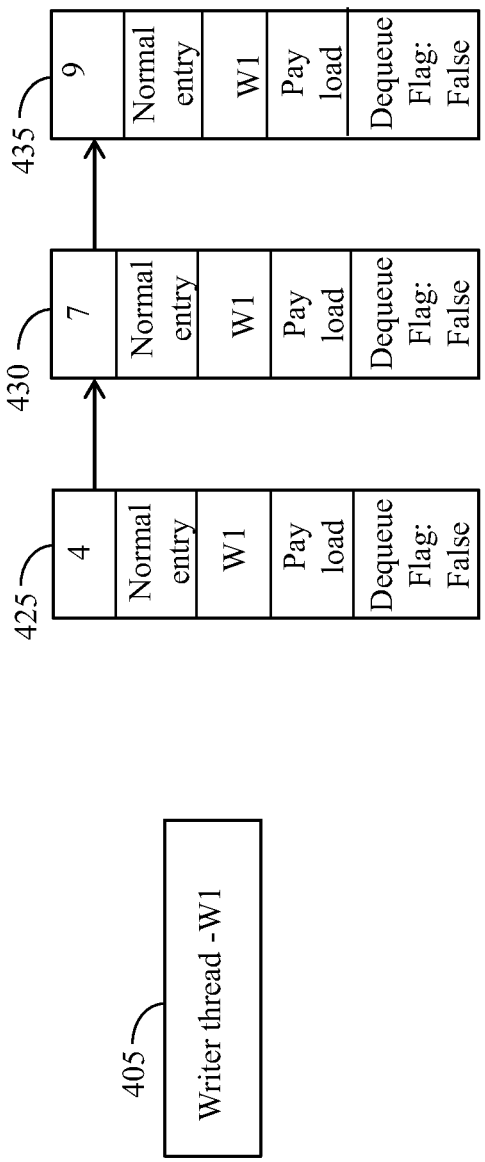
Figure 4G:
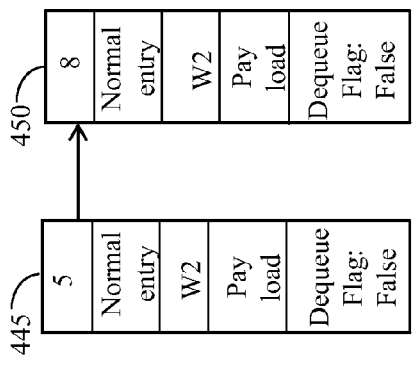
Figure 4H:
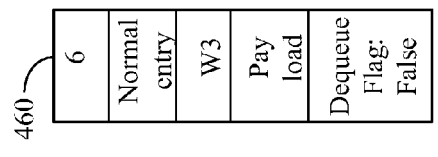
Figure 4I:
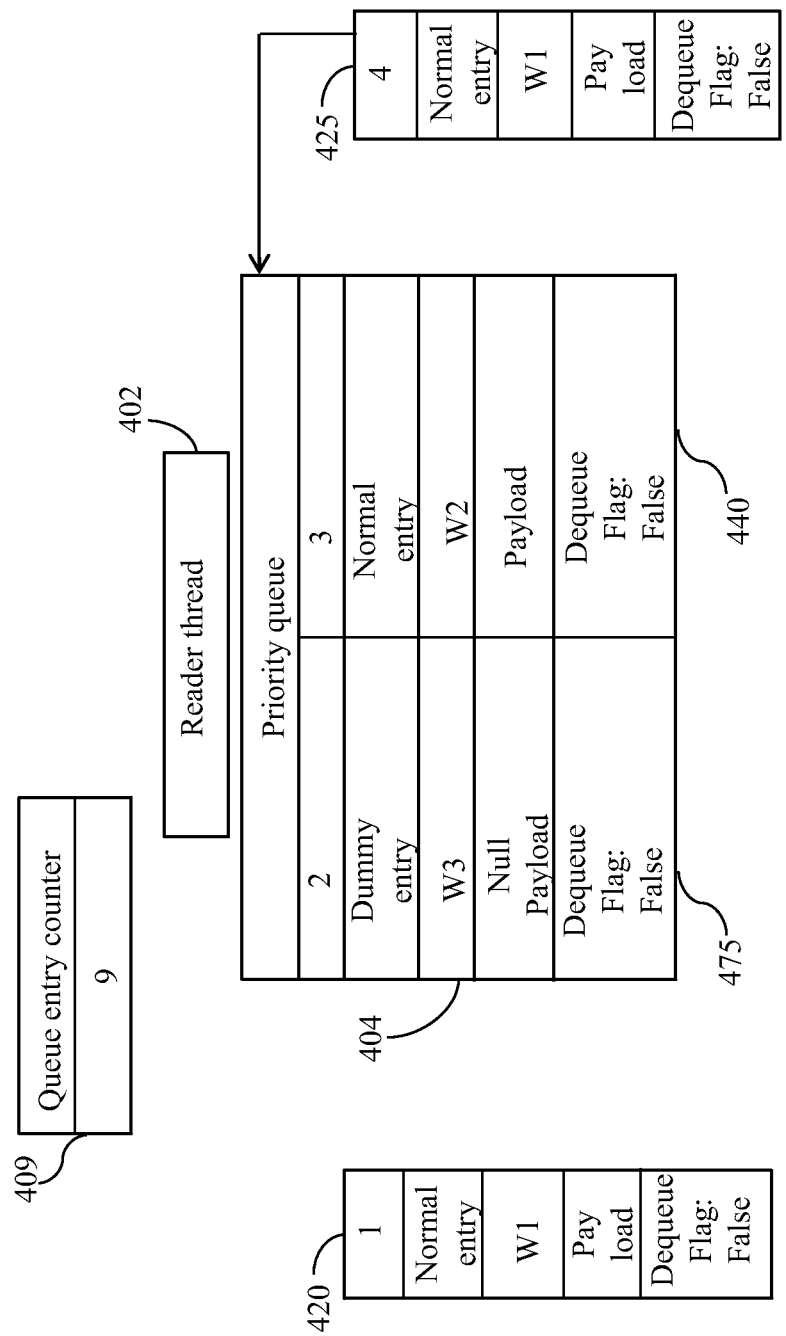
Figure 4J:
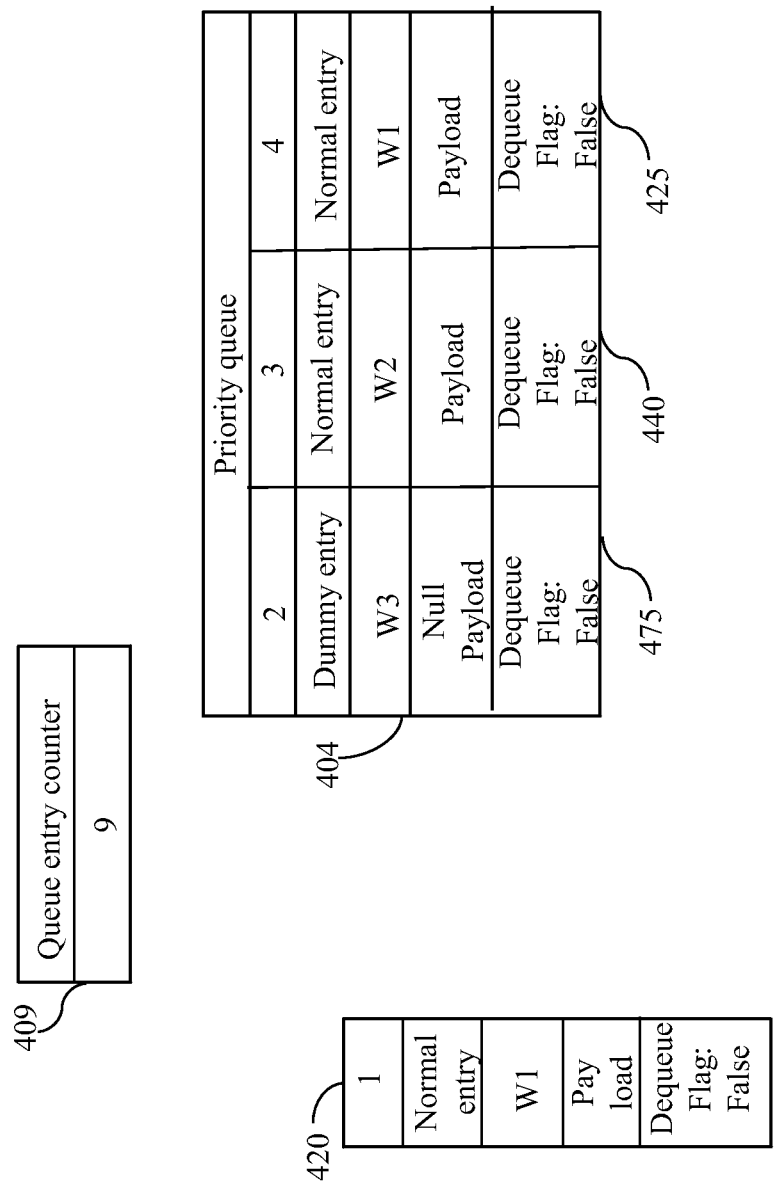
Figure 4M:
Figure 4N:
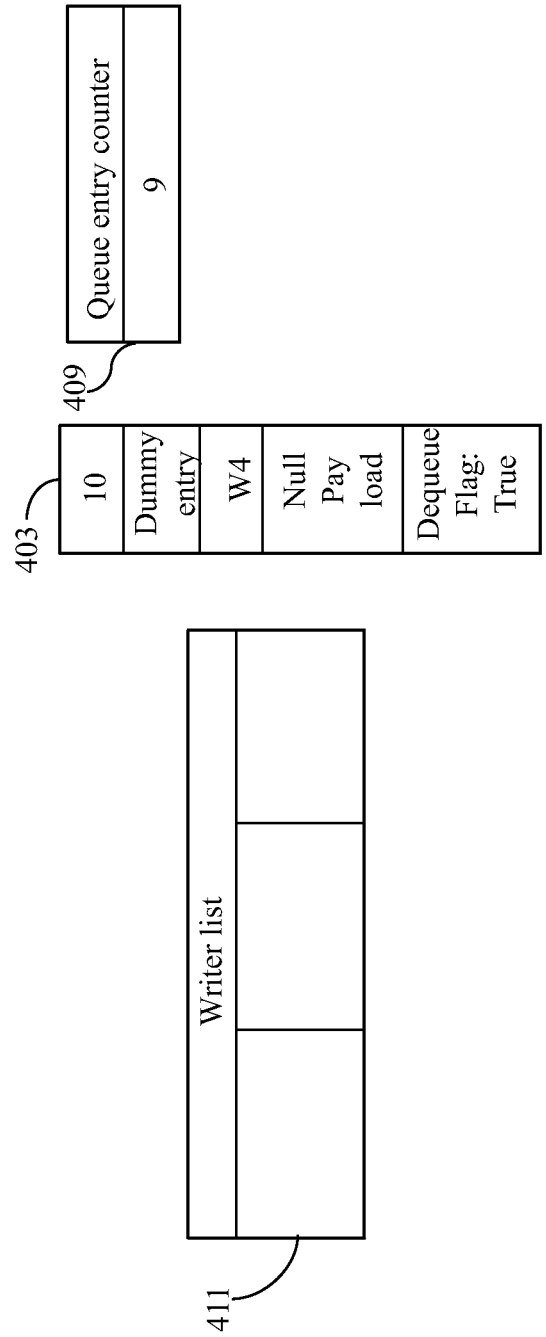
Figure 4O:
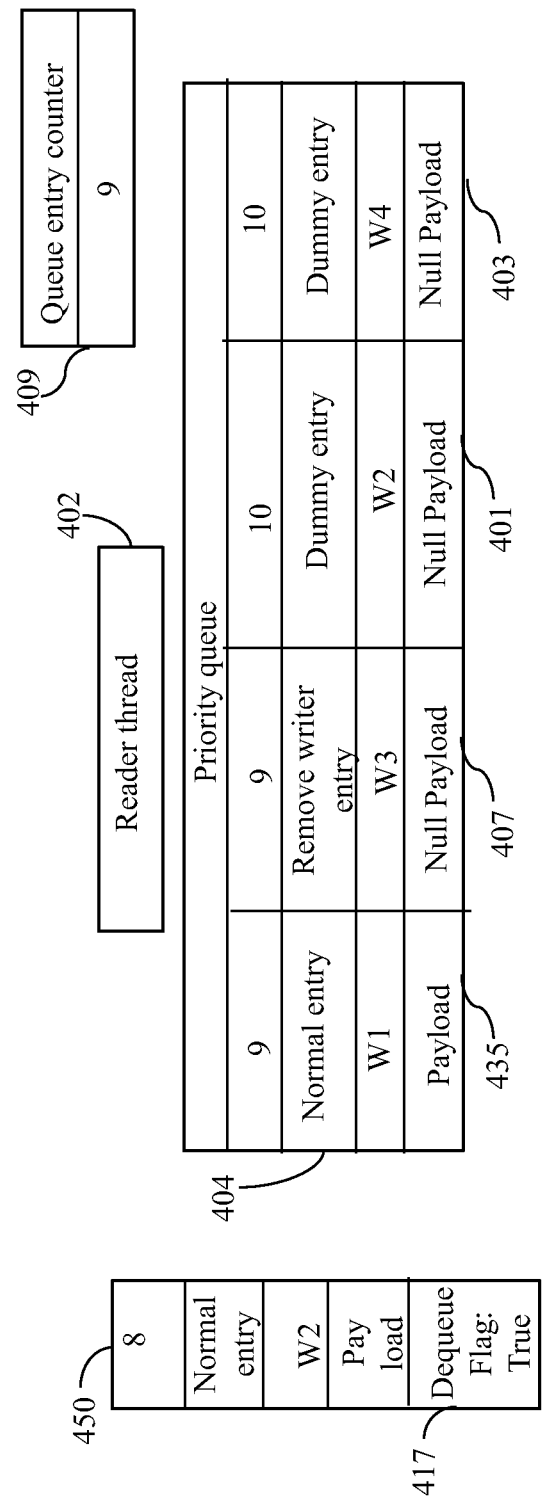
Figure 4P:
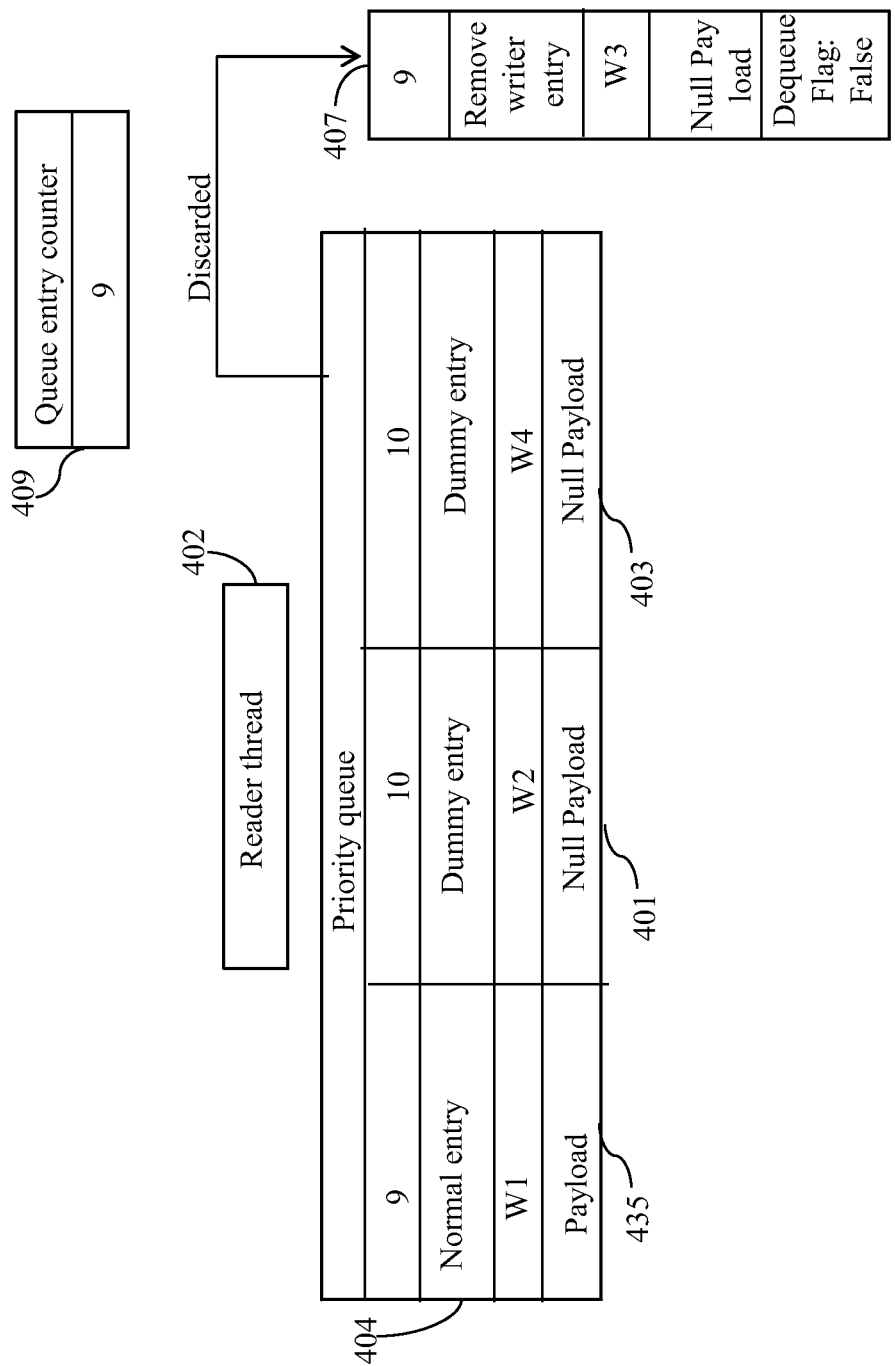

FIGS. 4A-4P illustrate exemplary views of implementing a multiple writer single reader queue, in accordance with one embodiment.

FIG. 4A and FIG. 4B includes 9 payloads with a queue entry number from 1 through 9 and three null payloads. The queue entry number indicates order of processing of the queue entries. In one example the queue entry number can include an atomic integer. In another example, a time stamp can be used for processing the queue entries in a sorted order. A queue entry counter 409 is used to assign the queue entry number. The payloads, in one example, can include, but are not limited to, multiple search queries obtained from various users. FIG. 4A and FIG. 4B also includes a writer thread 405 with a writer reference W1, a writer thread 410 with a writer reference W2 and a writer thread 415 with a writer reference W3.

The writer thread 405 creates a first writer queue and further creates a dummy queue entry 465. The dummy queue entry 465 includes a queue entry number 1, an entry type being a dummy entry, the writer reference W1, a null payload and a dequeue flag set to false. The dummy queue entry 465 is thus inserted into the first writer queue. Subsequently, the writer thread 405 is assigned a payload with a queue entry number 1, a payload with a queue entry number 4, a payload with a queue entry number 7 and a payload with a queue entry number 9. Hence, the writer thread 405 enqueues, a queue entry 420 associated with the queue entry number 1, the entry type being a normal entry, the writer reference W1 of the writer thread 405, the payload associated with the queue entry number 1 and the dequeue flag set to false; a queue entry 425 associated with the queue entry number 4, the entry type being the normal entry, the writer reference W1, the payload associated with the queue entry number 4 and the dequeue flag set to false; a queue entry 430 associated with the queue entry number 7, the entry type being the normal entry, the writer reference W1, the payload associated with the queue entry number 7 and the dequeue flag set to false; and a queue entry 435 associated with the queue entry number 7, the entry type being the normal entry, the writer reference W1, the payload associated with the queue entry number 9 and the dequeue flag set to false, into its writer queue.

Similarly, the writer thread 410 creates a second writer queue and further creates a dummy queue entry 470. The dummy queue entry 470 includes a queue entry number 1, the entry type being the dummy entry, the writer reference W2, a null payload and the dequeue flag set to false. The dummy queue entry 470 is thus inserted into the second writer queue. Subsequently, the writer thread 410 is assigned a payload with a queue entry number 3, a payload with a queue entry number 5 and a payload with a queue entry number 8. Hence, the writer thread 410 enqueues a queue entry 440 associated with the queue entry number 3, an entry type being the normal entry, the writer reference W2, the payload associated with the queue entry number 3 and the dequeue flag set to false; a queue entry 445 associated with the queue entry number 5 an entry type being the normal entry, the writer reference W2, the payload associated with the queue entry number 5 and the dequeue flag set to false; and a queue entry 450 associated with a queue entry number 8, an entry type being the normal entry, the writer reference W2, the payload associated with the queue entry number 8 and the dequeue flag set to false, into its writer queue.

Likewise, the writer thread 415 creates a third writer queue and further creates a dummy queue entry 475. The dummy queue entry 475 includes a queue entry number 2, the entry type being the dummy entry, the writer reference W3, a null payload and the dequeue flag set to false. The dummy queue entry 475 is thus inserted into the third writer queue. Subsequently, the writer thread 415 is assigned a payload with a queue entry number 2 and a payload with a queue entry number 6. Hence, the writer thread 415 enqueues a queue entry 455 associated with the queue entry number 2, an entry types being the normal entry, the writer reference W3, the payload associated with the queue entry number 2 and the dequeue flag set to false; and a queue entry 460 associated with a queue entry number 6, an entry type being the queue entry number 8, the writer reference W3, the payload associated with the queue entry number 6 and the dequeue flag set to false, into its writer queue. The queue entry numbers for the 9 payloads are assigned by a queue entry counter 409. Since, there are 9 queue entries, the queue entry counter 409 reads a counter value as 9. Further, the queue entry counter is incremented by one every time the queue entry including the entry type as normal entry is added into the writer queue. However, the queue entry counter is not incremented when the queue entry includes the entry type as the dummy entry or the remove writer entry.

FIG. 4C includes the writer list 411 maintained by the MWSR queue and a priority queue 404 that is empty maintained by the reader thread of the MWSR queue. The writer threads 405, 410 and 415 are listed on a writer list 411 in FIG. 4C. The priority queue 404 is empty prior to recognition of the writer threads by a reader thread.

A reader thread 402 recognizes the writer thread 405 with writer reference W1, the writer thread 410 with writer reference W2 and the writer thread 415 with writer reference W3. Further, upon recognizing, the reader thread 402 empties the writer list as shown in FIG. 4D. The recognition of the writer thread 405 is explained in detail in conjunction with FIG. 5 and FIG. 6A-6D. Since the reader thread 402 recognizes three writer threads, the reader thread 402 dequeues three dummy queue entries from the head end of the three writer queues and inserts the three dummy queue entries into a priority queue 404 as shown in FIG. 4D. The priority queue 404 in FIG. 4D includes the dummy queue entry 465 from the head end of the first writer queue of the writer thread 405 with writer reference W1, the dummy queue entry 470 from the head end of the second writer queue of the writer thread 410 with writer reference W2, and the dummy queue entry 475 from the third writer queue of the writer thread 415 with writer reference W3.

The reader thread further dequeues the queue entry including least value of the queue entry number. Thereby, each of the queue entries present in the three writer queues are dequeued in a FIFO order. The dequeuing process performed by the reader thread is explained in detail in conjunction to FIG. 5 and FIG. 6A-6D. FIG. 4E includes queue entry 420, 475 and 440 that are dequeued by the reader thread 402 from the head end of the writer threads 405, 415 and 410 respectively and inserted into the priority queue. Similarly, each of the nine queue entries is dequeued from the head ends of the writer threads 405, 415 and 410 in the FIFO order.

FIG. 4F represents the first writer queue associated with the writer thread 405 when the queue entry 420 is dequeued and inserted into the priority queue 404 by the reader thread 402. FIG. 4G represents the second writer queue associated with the writer thread 410 when the queue entry 440 is dequeued and inserted into the priority queue 404 by the reader thread 402. FIG. 4H represents the third writer queue associated with the writer thread 415 when the queue entry 455 is dequeued and inserted into the priority queue 404 by the reader thread 402.

The reader thread 402, upon retrieving the queue entry 420 from the priority queue 404, accesses the writer queue to which the queue entry 420 belongs and obtains a next queue entry 425 maintained by the writer thread 405 as shown in FIG. 4I. The next queue entry 425 with the queue entry number 4 obtained is thus inserted into the priority queue 404 as shown in FIG. 4J. Hence, the number of queue entries in the priority queue 404 is maintained to be equal to the number of active writer threads recognized by the reader thread 402. Further, FIG. 4J also includes the queue entry 420 retrieved from the priority queue 404 to be sent for further processing. Therefore the reader thread sends the queue entries for further processing in a FIFO order. The further processing, in one example can include, but is not limited to, writing the payload associated with the queue entry 420 into the log file. The log file can include, but not limited to, the search query, the IP address of the user, date, and time during which the search query was queried by the user. Further, the log file can also include date and time of viewing an html page of a particular website by a user. Similarly each of the queue entries present in the writer queues of the writer thread 405, the writer thread 410 and the writer thread 415 are dequeued from the head ends and inserted into the priority queue 404 in a sequential order. Further, all the queue entries inserted into the priority queue 404 are retrieved in the FIFO order of the queue entry number assigned to each of the queue entries.

In one embodiment, the writer queue of the writer thread 415 includes only a single queue entry, the queue entry 460 as shown in FIG. 4K. In such a case, the reader thread 402 does not physically dequeue the queue entry from the writer thread 415 however the queue entry is still inserted into the priority queue 404. The reader thread 402 further sets a dequeued flag 413 to true and marks the queue entry 460 as a dequeued entry as shown in FIG. 4K. Further, the marked queue entry 460 is inserted into the priority queue 404 as shown in FIG. 4L. Similarly, the reader thread 402 sets the dequeued flag to true and marks the queue entry when the writer queue of the writer thread 405 and the writer queue of the writer thread 410 includes a single queue entry. The dequeued flag when set to true indicates that the queue entry is obtained by the reader thread 402 for maintaining a FIFO order of processing the queue entries, however the queue entry continues to remain physically in the writer queue of the writer thread 415 until a new entry is added to the writer queue. The dequeued flag when set to true prevents processing the queue entries multiple times and also enables the reader thread to dequeue a next queue entry from the writer queue of the queue entry including the dequeue flag set to true.

In some embodiments, a new writer thread with a writer reference W4 is created. In such cases, the new writer thread is inserted to the writer list 411 as shown in FIG. 4M prior to recognizing of the new writer thread with writer reference W4 by the reader thread 402. Further, the new writer thread creates a dummy entry 403 with a queue entry number 10 as shown in FIG. 4N and inserts the dummy entry 403 into a fourth writer queue owned exclusively by the new writer thread. The reader thread 402 upon identifying that the writer list 411 is not empty dequeues the new writer thread with the writer reference W4. The reader thread 402 thus accesses the writer queue of the new writer thread and retrieves the dummy entry 403 and inserts it into the priority queue 404 as shown in FIG. 4O, thereby the reader thread 402 starts recognizing the new writer thread with the writer reference W4. The priority queue 404 will thus include four entries since the new writer thread is recognized and hence considered as an active writer thread. Since the queue entry 403 includes the entry type as dummy entry, the queue entry counter 409 continues to read the counter value as 9 as shown in FIG. 4O. The dummy entry with the queue entry number 10 is put into the priority queue 404 for considering the new writer thread with the writer reference W4 at appropriate time.

In some embodiments, the writer thread 415 is required to be removed from the writer list. Hence a queue entry 407 with a queue entry number 9, the entry type being a remove writer entry with a null payload is inserted into the priority queue 404 as shown in FIG. 4O. When a queue entry includes the entry type as the remove writer entry, then the queue entry counter 409 does not increment and hence, continues to read the counter value as 9 as shown in FIG. 4O. The entry number of the remove writer entry is always equal to the counter value of the queue entry counter at an instant when the remove writer entry is created. The reader thread 402, upon dequeing the queue entry 407 from the priority queue 404 discards the queue entry 407 as the entry type is the remove writer entry as shown in FIG. 4P. Thereby reference to the writer thread is lost and the reader thread stops accessing the writer queue of the writer thread 405.

In some embodiments, when all the four queue entries of the writer queue of the writer thread 410 as shown in FIG. 4A has been processed, then the writer queue of the writer thread 410 is considered empty. When the writer queue of the writer thread 410 is considered empty, the dequeue flag 417 of the queue entry 450 is set to true as shown in FIG. 4O. The dequeue flag when set to true indicates that the queue entry 450 has been processed by the reader thread but remains in the writer queue until a new queue entry is added. When the writer queue is empty, then the reader thread 402 creates a queue entry 401 with the queue entry number 10 having an entry type as a dummy entry with a null payload and the writer reference W2. The queue entry 401 created is thus inserted into the priority queue 404 as shown in FIG. 4O. The queue entry 401 is created and inserted into the priority queue, since the reader thread does not want to miss a reference to the writer thread 410. The queue entry counter 409, however, continues to read the counter value as 9 as shown in FIG. 4O since the entry type is the dummy entry. Hence, by storing the dummy entry, the writer reference W2 associated with the corresponding entry 401 is active and can still be recognized and polled by the reader thread 402 regardless of absence of the payload. Subsequently, while the reader thread 402 encounters the writer reference W2 while polling the priority queue 404, then the reader thread 402 returns back to the writer queue associated with the writer reference W2 to ascertain if the writer queue is still empty or the writer queue has obtained a new queue entry. Further, when the writer queues of all the writer threads are empty, then the reader thread creates queue entries with entry type as dummy entries and inserts the dummy entries into the priority queue 404.

Figure 5:
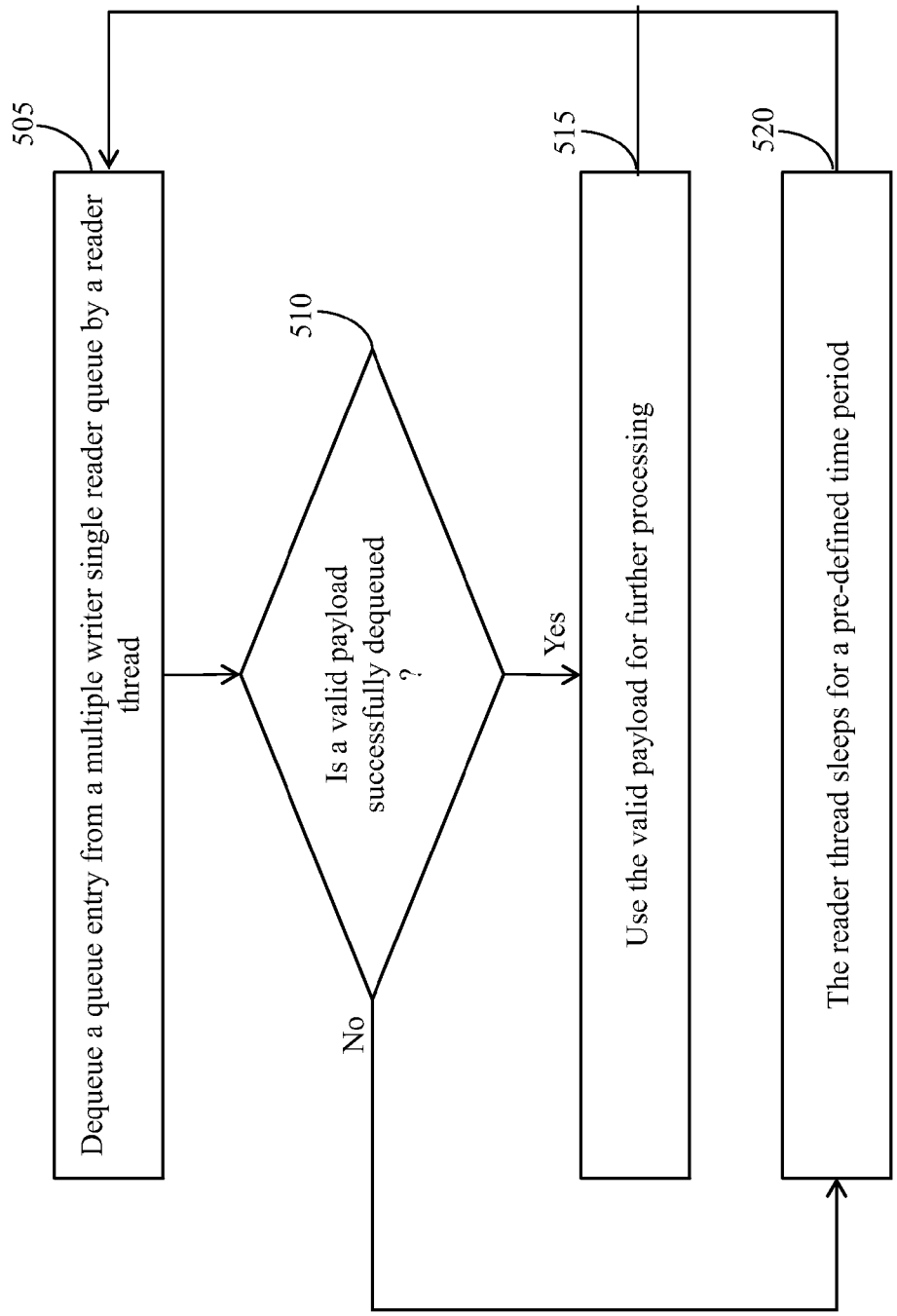
FIG. 5 is a flow chart illustrating a method of dequeuing a queue entry from a multiple writer single reader queue, in a lock free and a contention free manner, by a reader thread of an application, in accordance with one embodiment.
Figure 6A:
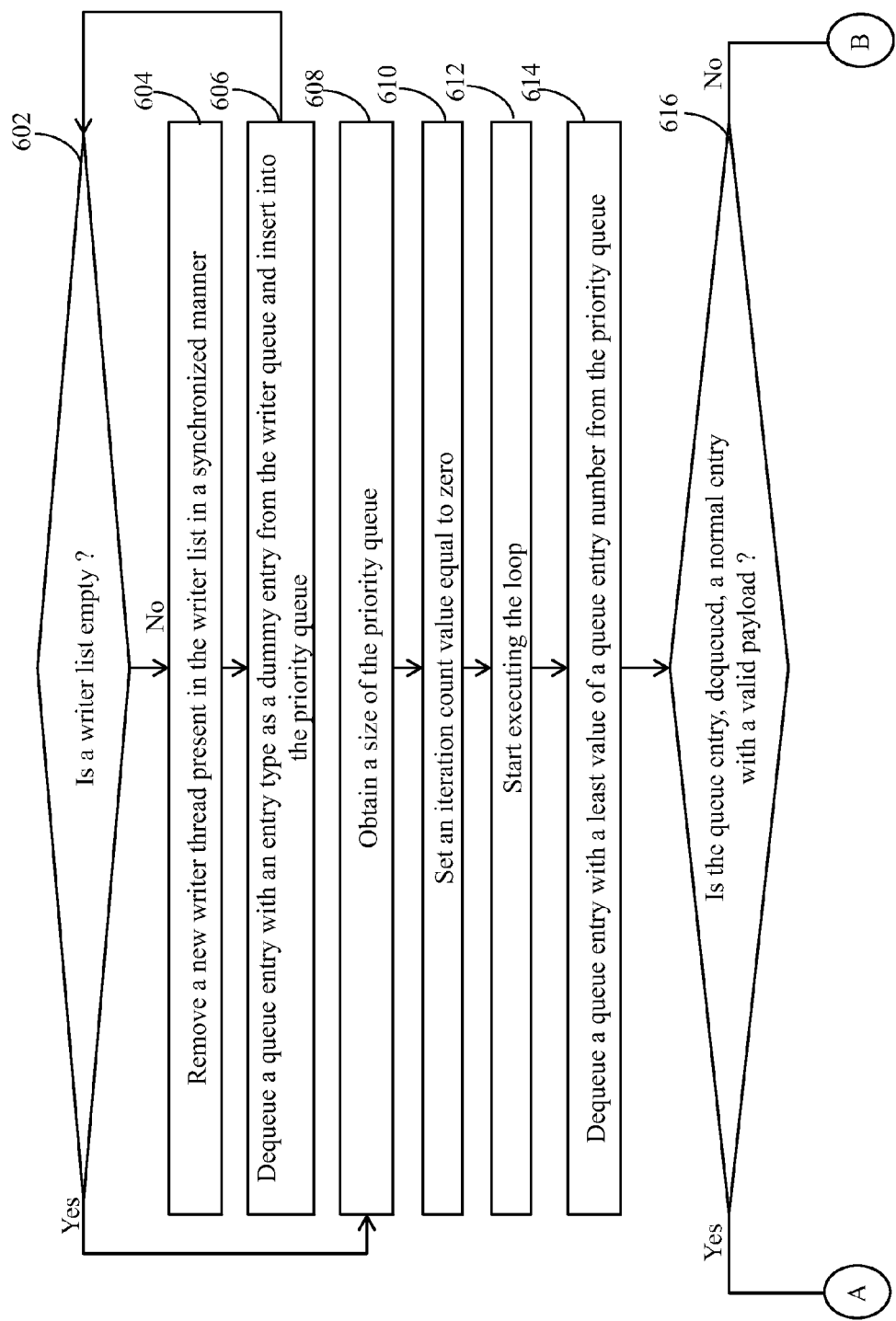
FIG. 6A-6D is a flow chart illustrating a method of implementing a dequeuing process by a reader thread, in accordance with one embodiment.
Figure 6B:
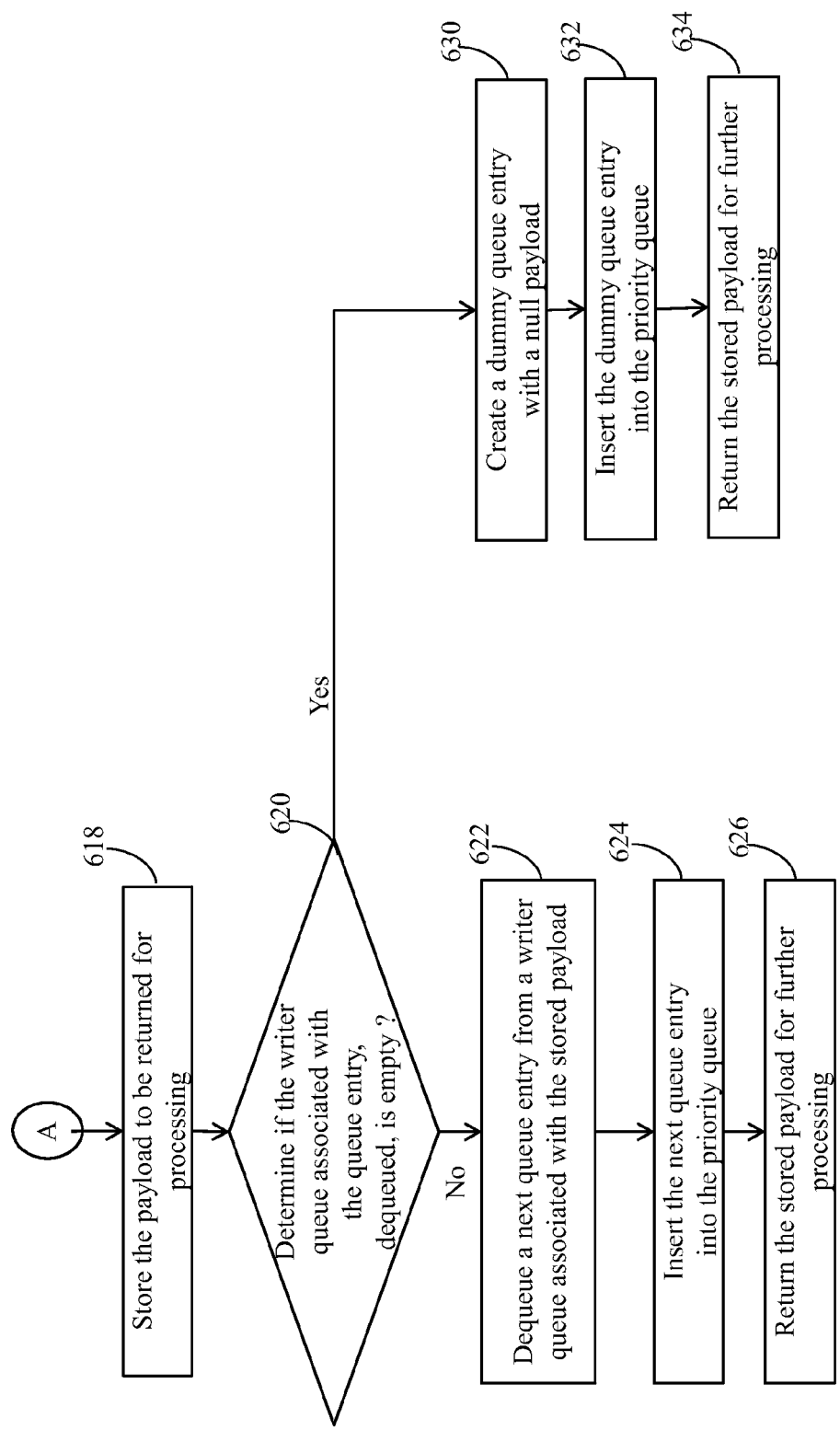
Figure 6C:
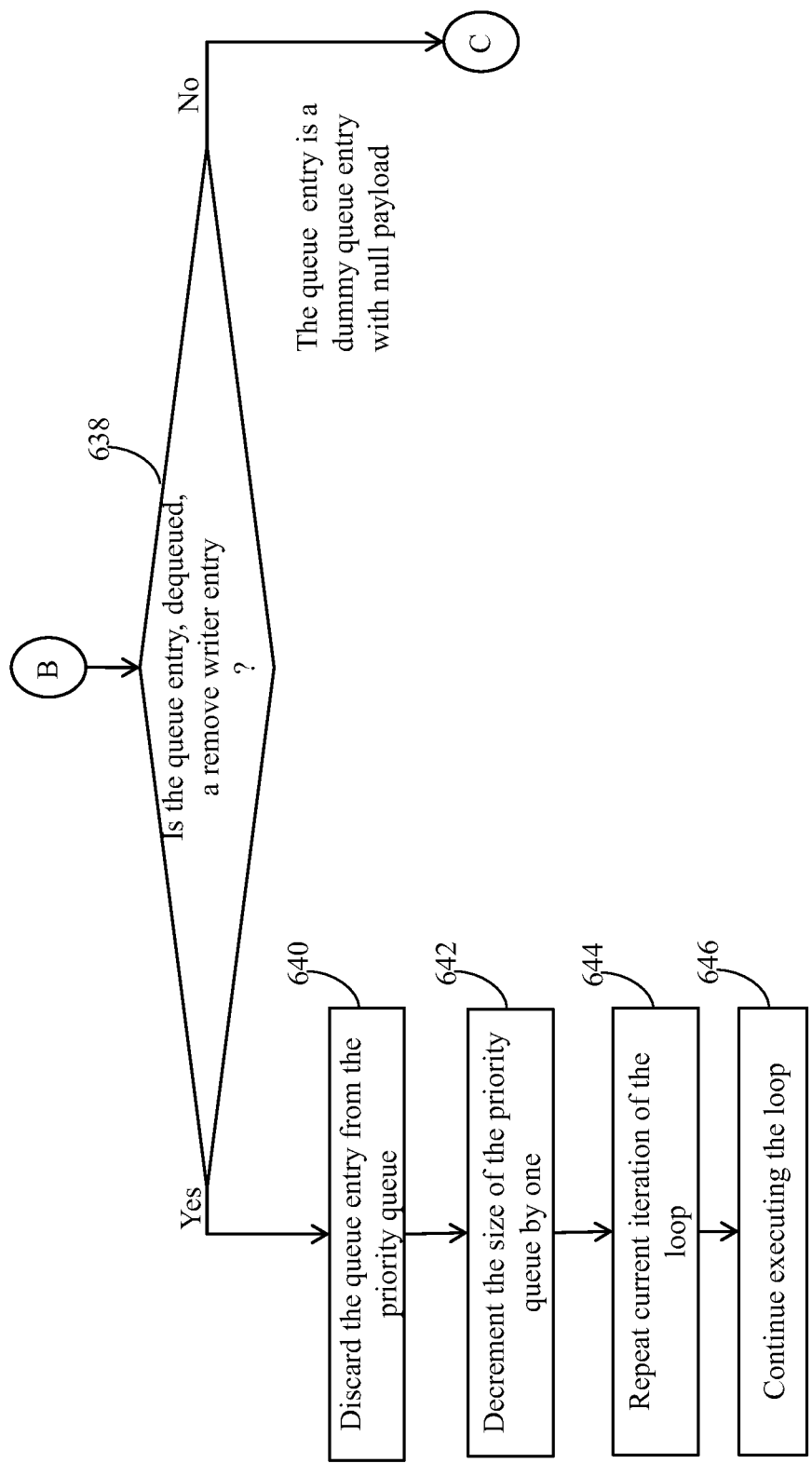
Figure 6D:
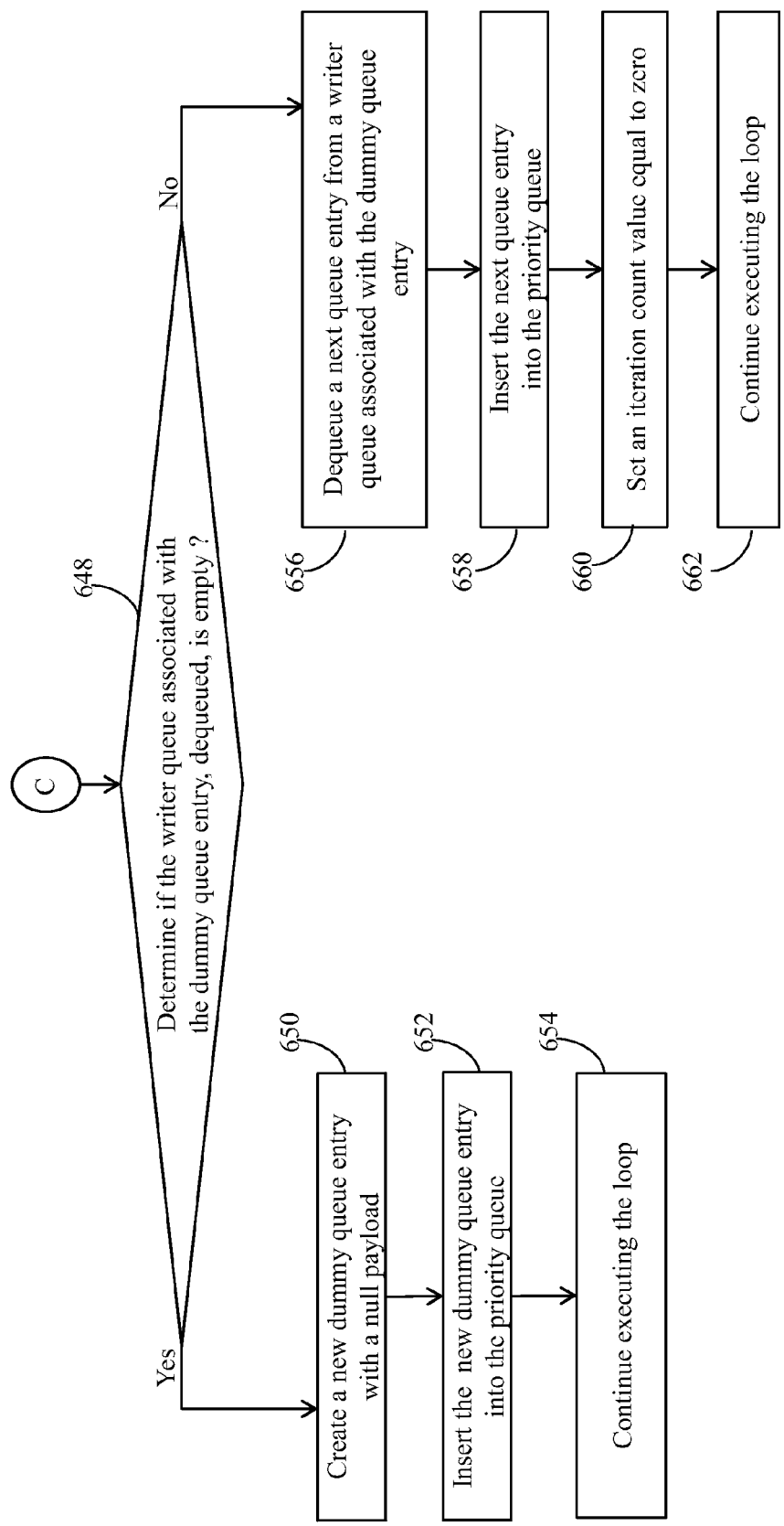

FIG. 5 is a flow chart illustrating a method of dequeuing a queue entry from a multiple writer single reader (MWSR) queue, in a lock free and a contention free manner, by a reader thread of an application, in accordance with one embodiment.

At step 505, a queue entry from the MWSR queue is dequeued by a reader thread. Instructions are used for dequeuing the queue entry. Dequeuing includes reading the queue entry obtained from the MWSR queue. The dequeuing process of the MWSR queue is explained in detail in conjunction with FIG. 6A-6D.

At step 510, the reader thread of the application checks if a valid payload is successfully dequeued from the MWSR queue. If yes, then the method branches to step 515 else the method branches to step 520.

At step 515, the valid payload, dequeued, is utilized for further processing. The further processing, in one example can include, but is not limited to, writing the payload associated with the queue entry into the log file. The log file can include, but not limited to, the search query, date and time during which the search query was queried by the user. Further, the log file can also include, but not limited to, date and time of viewing an html page of a particular website by a user or the IP address of the user. Further, upon processing, the reader thread loops back to step 505.

At step 520, the reader thread sleeps for a pre-defined amount of time. The reader thread sleeps when the reader thread dequeues a null payload. The null payload when dequeued indicates that the priority queue maintained by the reader thread is empty. The priority queue is empty when each of the active writer threads includes dummy entries. The priority queue can also be empty when there are no active writer threads. Hence, upon dequeuing the null payload, the reader thread sleeps for the pre-defined amount of time. When the pre-defined amount of time lapses, the reader thread loops back to step 505.

FIG. 6A-6D is a flow chart illustrating a method of implementing a dequeue operation of an MWSR queue, by a reader thread, in accordance with one embodiment.

At step 602, a reader thread determines if a writer list the writer list 411 is empty. If yes, then the method branches to step 608. Further, if the writer list is not empty, then the method branches to step 604. The writer list includes one or more new writer threads that are not recognized by the reader thread. The reader thread, prior to dequeuing the queue entries, checks the writer list, for recognizing the new writer threads, since the reader thread last processed. Upon recognition, the writer thread is removed from the writer list by the reader thread.

At step 604, a new writer thread including a dummy entry in a writer queue of the new writer thread is removed from the writer list in a synchronized manner. A Lock can be implemented for synchronization. However, the lock is used only when the writer list is not empty. In one example, adding of the new writer thread into the writer list and checking of the writer list by the reader thread can occur simultaneously. If the reader thread possesses the lock, then the process of recognizing the new writer thread is performed. The reader thread checks the writer list to determine if the new writer thread is added and starts recognizing the new writer thread. The reader thread upon removing one writer thread at once from the writer list starts recognizing the writer thread.

At step 606, a dummy queue entry is dequeued by the reader thread. The dummy queue entry is dequeued from a writer queue of the new writer thread. The dummy queue entry dequeued is further inserted into a priority queue. The priority queue can also be referred to as a sorted queue. The reader thread upon inserting can now start dequeuing the queue entries from the writer queue owned exclusively by the new writer thread. Further the step 606 loops back to step 602 until the writer list is empty.

At step 608, a size of the priority queue is obtained. The size of the priority queue is obtained once the writer list is empty. The size of the priority queue is equal to the number of active writer threads recognized by the reader thread. The size of the priority queue is used as an iteration count value to iterate a loop for dequeuing the queue entries from each of the writer queues owned exclusively by the active writer threads.

At step 610, the iteration count value is set to zero prior to executing the loop for dequeuing a queue entry from the priority queue. Subsequently, upon setting the iteration count value to zero, the loop is executed. Number of times the loop is iterated is equal to the number of the active writer threads. The number of active writer threads is also equal to the size of the priority queue.

At step 612, the loop for dequeuing the queue entries from the writer queues begins to execute. In one example, a for loop can be used for dequeuing the queue entries.

At step 614, a queue entry with a least value of a queue entry number is dequeued from the priority queue. The reader thread also identifies the writer thread, to which the queue entry belongs, by using the writer reference associated with the queue entry.

At step 616, the reader thread determines if the queue entry dequeued at step 614 includes an entry type as a normal entry with a valid payload. If yes, then the method branches to step 618. Further, if the queue entry dequeued does not include the entry type as the normal entry with the valid payload, then the method branches to step 638.

At step 618, the valid payload, associated with the queue entry including the entry type as the normal entry, is stored to be returned subsequently for further processing.

At step 620, the reader thread determines if the writer queue associated with the queue entry dequeued at step 614 is empty. If yes, then the method branches to step 630 else the method branches to step 622.

At step 622, a next queue entry is dequeued from the writer queue of the queue entry including the entry type as the normal entry. The queue entry is dequeued since the reader thread identified the writer queue as not empty at step 620.

At step 624, the next queue entry, dequeued at step 622, is inserted into the priority queue.

At step 626, the reader thread returns the stored payload as mentioned in step 618 for further processing, since the queue entry dequeued includes an entry type as a normal entry with the valid payload.

At step 630, the reader thread creates a dummy queue entry with the entry type being the dummy entry with a null payload and the queue entry number is set to the current value of the queue entry counter incremented by one, however, the queue entry counter value is unaltered.

At step 632, the dummy queue entry is inserted into the priority queue. The dummy queue entry is inserted so that the writer reference associated with the writer thread is not lost and the reader thread can continue to poll the writer queue associated with the writer thread in future. Further, in such cases a current value of a queue entry counter is unaltered and the dummy queue entry holds the current value of the queue entry counter.

At step 634, the reader thread returns the stored payload as mentioned in step 618 for further processing, since the queue entry dequeued includes an entry type as a normal entry with the valid payload.

At step 638, the reader thread determines, if the queue entry dequeued at step 614 includes an entry type as a remove writer entry. If yes, then the method branches to step 640 else the method branches to step 648. Further, the branching to step 648 indicates that the queue entry dequeued at step 614 includes an entry type as a dummy entry with a null payload.

At step 640, the reader thread discards the queue entry dequeued from the priority queue. Upon discarding, the reader thread derecognizes the writer thread associated with the discarded queue entry and further the writer reference associated with the discarded queue entry is lost.

At step 642, the size of the priority queue is decremented by one since the queue entry is discarded from the priority queue.

At step 644, the current iteration of the loop is repeated.

At step 646, the loop mentioned at step 612 begins to execute with the same iteration value as specified at step 644.

At step 648, the reader thread determines, if the writer queue of the dummy queue entry dequeued at step 614 is empty. If yes, then the method branches to step 650 else the method branches to step 656.

At step 650, the reader thread creates a new dummy queue entry with a new entry number, the entry type being the dummy entry with a null payload. The new entry number is equal to the current value of the queue entry counter incremented by one. However, the queue entry counter value is unaltered.

At step 652, the new dummy queue entry created in step 650 is inserted into the priority queue. The new dummy queue entry is inserted so that the writer reference associated with the writer thread of the new dummy queue entry is not lost and the reader thread can continue to poll the writer queue associated with the writer thread in future.

At step 654, the loop for dequeuing the queue entries from the writer queues begins to execute.

At step 656, a next queue entry is dequeued from the writer queue associated with the dummy queue entry since the reader thread at step 648 determines the writer queue of the dummy queue entry dequeued at step 614 as not empty.

At step 658, the next queue entry, dequeued at step 656, is inserted into the priority queue.

At step 660, the iteration count value is set to zero.

At step 662, the loop as mentioned at step 612 begins to execute.

In some embodiments, if a writer queue includes only one queue entry then the reader thread cannot dequeue the queue entry from the writer queue since the head end and the tail end of the writer queue are the same. In such a case, the reader thread does not physically dequeue the queue entry, however, the queue entry is still inserted into the priority queue. The reader thread further sets a dequeued flag to true. The dequeued flag when set to true indicates that the queue entry is obtained by the reader thread for maintaining a FIFO order of processing the queue entries, however the queue entry continues to remain physically in the writer queue until a new queue entry is added to the writer queue. Further, the queue entry that remains physically in the writer queue is marked to prevent the reader thread from processing the queue entry multiple times. Marking can be performed by setting a dequeue flag to true.

In some embodiments, multiple reader threads can be used for dequeuing the queue entries from the priority queue. The reader threads are synchronized such that, at an instant, only one reader thread can dequeue a queue entry from the priority queue. However, each of the writer threads can continue to insert the queue entries into the corresponding writer queues without interruption.

The method specified in the present disclosure enables implementing a multiple writer single reader (MWSR) queue that, in one example, can be widely used for logging web search queries into a log file. The method allows multiple writer threads to add queue entries into a tail end of respective writer queues and a single reader thread retrieves the queue entries continuously from the head end of the writer queues. Hence, the queue entries are enqueued and dequeued in a lock free and contention free manner. Further, the writer thread on adding the entry into its writer queue can return back to the web server pool, thereby becoming available for servicing other search queries. Hence, response time for servicing the search queries decreases and throughput is increased. Also, by implementing the MWSR queue in a lock free and contention free manner, valuable CPU cycles are conserved for beneficial use.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method of implementing a multiple writer single reader queue in a lock free and a contention free manner, the method comprising:
   receiving a plurality of payloads from a plurality of users;
   assigning a first payload of the plurality of payloads to a first writer thread of a plurality of writer threads, and assigning a second payload of the plurality of payloads to a second writer thread of the plurality of writer threads;
   creating a first writer queue by the first writer thread exclusively owned by the first writer thread, and creating a second writer queue by the second writer thread exclusively owned by the second writer thread;
   enqueuing the first payload as a first queue entry, said first queue entry including a first queue entry number, a first writer queue identifier, a first entry type, a first writer reference, wherein the first payload is enqueued into the first writer queue identified by the first writer queue identifier by the first writer thread identified by the first writer reference, and enqueuing the second payload as a second queue entry, said second queue entry including at least one of a second queue entry number, a second writer queue identifier, a second entry type, a second writer reference, wherein the second payload is enqueued into the second writer queue identified by the second writer queue identifier by the second writer thread identified by the second writer reference;
   wherein the first and second queue entry numbers are generated by a queue entry counter which generates queue entry numbers in unique and increasing order in atomic fashion;
   dequeuing the first queue entry from the first writer queue and the second queue entry from the second writer queue in order of their respective queue entry numbers, and inserting the retrieved first and second queue entries into a sorted queue maintained by a reader thread, the dequeuing and inserting being done by the reader thread and whereby the first and second queue entries are inserted into the sorted queue in order of their respective queue entry numbers;
   identifying a queue entry in the sorted queue having the lowest queue entry number;
   enqueuing another queue entry into the sorted queue from the writer queue from which the queue entry having the lowest queue entry number was obtained;
   dequeuing from the sorted queue the queue entry having the lowest queue entry number for processing by the reader thread; and processing the dequeued queue entry from the sorted queue.

2. The method as claimed in claim 1, wherein the first and second entry types comprise a variable to store one of a normal entry, a dummy entry and a remove writer entry.

3. The method as claimed in claim 2, wherein the normal entry indicates that one payload of the plurality of payloads is present in the sorted queue, the dummy entry indicates that one payload of the plurality of payloads is absent in the sorted queue and, the remove writer entry indicates that one writer thread of the plurality of writer threads is required to be removed from the sorted queue.

4. The method as recited in claim 2:
wherein the dummy entry serves as a place holder, and includes a queue entry number, an entry type as a dummy entry, and a null payload;
whereby the number of queue entries within the sorted queue is equal to the number of writer queues.

5. The method as claimed in claim 2, further comprising consulting the first writer queue for the presence of a new payload if (i) the entry type is a dummy entry and (ii) the time is appropriate for processing the entry whose entry number is associated with the dummy entry because the entry having an immediately preceding entry number has been processed.

6. The method as claimed in claim 1 and further comprising:
adding one or more writer threads in real time, wherein the one or more writer threads are recognized by the reader thread; and
removing the one or more writer threads in real time.

7. The method as recited in claim 1, further comprising:
processing the first queue entry from the sorted queue;
if there is a third queue entry that has been enqueued into the first writer queue, then retrieving the third queue entry from the sorted queue;
whereby the number of queue entries within the sorted queue is equal to the number of writer queues.

8. The method as recited in claim 1, further comprising:
processing the first queue entry from the sorted queue;
if there is not a third queue entry that has been enqueued into the first writer queue, then inserting a dummy entry into the sorted queue, the dummy entry including the first queue entry number;
whereby the number of queue entries within the sorted queue is equal to the number of writer queues.

9. The method as claimed in claim 1, wherein, responsive to the processing, the first and second writer queues are checked for respective third and fourth queue entries; and
(i) if the respective third and fourth queue entries are present, dequeueing the respective third and fourth queue entries in the sorted order by queue entry number, and inserting the respective third and fourth queue entries into the sorted queue in the sorted order by queue entry number; and
(ii) if either one of the respective third and fourth queue entries are not present, inserting a dummy entry into the sorted queue, the dummy entry representing the respective one of the first and second writer queues and having an entry type designating it a dummy entry;
whereby the number of entries in the sorted queue remains equal to the number of writer queues even if a writer queue contains no queue entries.

10. A computer program product stored on a non-transitory computer-readable medium that when executed by a processor, performs a method of implementing a multiple writer single reader queue in a lock free and a contention free manner, comprising:
receiving a plurality of payloads from a plurality of users;
assigning a first payload of the plurality of payloads to a first writer thread of a plurality of writer threads, and assigning a second payload of the plurality of payloads to a second writer thread of the plurality of writer threads;
creating a first writer queue by the first writer thread exclusively owned by the first writer thread, and creating a second writer queue by the second writer thread exclusively owned by the second writer thread;
enqueuing the first payload as a first queue entry, said first queue entry including a first queue entry number, a first writer queue identifier, a first entry type, a first writer reference, wherein the first payload is enqueued into the first writer queue identified by the first writer queue identifier by the first writer thread identified by the first writer reference, and enqueuing the second payload as a second queue entry, said second queue entry including at least one of a second queue entry number, a second writer queue identifier, a second entry type, a second writer reference, wherein the second payload is enqueued into the second writer queue identified by the second writer queue identifier by the second writer thread identified by the second writer reference;
wherein the first and second queue entry numbers are generated by a queue entry counter which generates queue entry numbers in unique and increasing order in atomic fashion;
dequeuing the first queue entry from the first writer queue and the second queue entry from the second writer queue in order of their respective queue entry numbers, and inserting the retrieved first and second queue entries into a sorted queue maintained by a reader thread, the dequeuing and inserting being done by the reader thread and whereby the first and second queue entries are inserted into the sorted queue in order of their respective queue entry numbers;
identifying a queue entry in the sorted queue having the lowest queue entry number;
enqueuing another queue entry into the sorted queue from the writer queue from which the queue entry having the lowest queue entry number was obtained;
dequeuing from the sorted queue the queue entry having the lowest queue entry number for processing by the reader thread; and
processing the dequeued queue entry from the sorted queue.

11. The computer program product as claimed in claim 10, wherein the entry type comprises a variable to store one of a normal entry, a dummy entry and a remove writer entry.

12. The computer program product as claimed in claim 11, the normal entry indicates that one payload of the plurality of payloads is present in the sorted queue, the dummy entry indicates that one payload of the plurality of payloads is absent in the sorted queue and, the remove writer entry indicates that one writer thread of the plurality of writer threads is required to be removed from the sorted queue.

13. The computer program product as recited in claim 11, wherein the dummy entry serves as a place holder, and includes a queue entry number, an entry type as a dummy entry, and a null payload, whereby the number of queue entries within the sorted queue is equal to the number of writer queues.

14. The computer program product as claimed in claim 11, further comprising consulting the first writer queue for the presence of a new payload if (i) the entry type is a dummy entry and (ii) the time is appropriate for processing the entry whose entry number is associated with the dummy entry because the entry having an immediately preceding entry number has been processed.

15. The computer program product as claimed in claim 10 and further comprising:
   adding one or more writer threads in real time, wherein the one or more writer threads are recognized by the reader thread; and
   removing the one or more writer threads in real time.

16. The computer program product as recited in claim 10, further comprising:
   processing the first queue entry from the sorted queue;
   if there is a third queue entry that has been enqueued into the first writer queue, then retrieving the third queue entry from the sorted queue;
   whereby the number of queue entries within the sorted queue is equal to the number of writer queues.

17. The computer program product as recited in claim 10, further comprising:
   processing the first queue entry from the sorted queue;
   if there is not a third queue entry that has been enqueued into the first writer queue, then inserting a dummy entry into the sorted queue, the dummy entry including the first queue entry number;
   whereby the number of queue entries within the sorted queue is equal to the number of writer queues.

18. The computer program product as claimed in claim 10, wherein, responsive to the processing, the first and second writer queues are checked for respective third and fourth queue entries; and
   (i) if the respective third and fourth queue entries are present, dequeueing the respective third and fourth queue entries in the sorted order by queue entry number, and inserting the respective third and fourth queue entries into the sorted queue in the sorted order by queue entry number; and
   (ii) if either one of the respective third and fourth queue entries are not present, inserting a dummy entry into the sorted queue, the dummy entry representing the respective one of the first and second writer queues and having an entry type designating it a dummy entry;
   whereby the number of entries in the sorted queue remains equal to the number of writer queues even if a writer queue contains no queue entries.

19. A system implementing a multiple writer single reader queue in a lock free and a contention free manner, the system comprising:
   an electronic device for displaying a plurality of payloads;
   a memory that stores instructions;
   a processor; and
   a communication interface in electronic communication with the electronic device and the processor, the processor responsive to the instructions to receive a plurality of payloads from a plurality of users;
   assign a first payload of the plurality of payloads to a first writer thread of a plurality of writer threads, and assign a second payload of the plurality of payloads to a second writer thread of the plurality of writer threads;
   create a first writer queue by the first writer thread exclusively owned by the first writer thread, and create a second writer queue by the second writer thread exclusively owned by the second writer thread;
   enqueue the first payload as a first queue entry, said first queue entry including a first queue entry number, a first writer queue identifier, a first entry type, a first writer reference, wherein the first payload is enqueued into the first writer queue identified by the first writer queue identifier by the first writer thread identified by the first writer reference, and enqueue the second payload as a second queue entry, said second queue entry including at least one of a second queue entry number, a second writer queue identifier, a second entry type, a second writer reference, and wherein the second payload is enqueued into the second writer queue identified by the second writer queue identifier by the second writer thread identified by the second writer reference;
   wherein the first and second queue entry numbers are generated by a queue entry counter which generates queue entry numbers in unique and increasing order in atomic fashion;
   dequeue the first queue entry from the first writer queue and the second queue entry from the second writer queue in order of their respective queue entry numbers, and inserting the retrieved first and second queue entries into a sorted queue maintained by a reader thread, the dequeuing and inserting being done by the reader thread and whereby the first and second queue entries are inserted into the sorted queue in order of their respective queue entry numbers;
   identify a queue entry in the sorted queue having the lowest queue entry number;
   enqueue another queue entry into the sorted queue from the writer queue from which the queue entry having the lowest queue entry number was obtained;
   dequeue from the sorted queue the queue entry having the lowest queue entry number for processing by the reader thread; and
   process the dequeued queue entry from the sorted queue.

20. The system as claimed in claim 19, wherein a processor is further responsive to the instructions to:
   create the plurality of writer threads; and
   create the reader thread.

21. The system as claimed in claim 19, wherein a processor is further responsive to the instructions to:
   add one or more writer threads in real time; and
   remove the one or more writer threads in real time.

22. The system as recited in claim 19, wherein the processor is further responsive to the instructions:
   to process the first queue entry from the sorted queue; and
   if there is a third queue entry that has been enqueued into the first writer queue, then to retrieve the third queue entry from the sorted queue;
   whereby the number of queue entries within the sorted queue is equal to the number of writer queues.

23. The system as recited in claim 19, wherein the processor is further responsive to the instructions:
   to process the first queue entry from the sorted queue;
   if there is not a third queue entry that has been enqueued into the first writer queue, then to insert a dummy entry into the sorted queue, the dummy entry including the first queue entry number;
   whereby the number of queue entries within the sorted queue is equal to the number of writer queues.

24. The system as claimed in claim 19, wherein, responsive to the processing, the first and second writer queues are checked for respective third and fourth queue entries; and
   (i) if the respective third and fourth queue entries are present, dequeueing the respective third and fourth queue entries in the sorted order by queue entry number, and inserting the respective third and fourth queue entries into the sorted queue in the sorted order by queue entry number; and
   (ii) if either one of the respective third and fourth queue entries are not present, inserting a dummy entry into the sorted queue, the dummy entry representing the respective one of the first and second writer queues and having an entry type designating it a dummy entry;

whereby the number of entries in the sorted queue remains equal to the number of writer queues even if a writer queue contains no queue entries.

25. The system as claimed in claim 19, wherein the first and second entry types comprise a variable to store one of a normal entry, a dummy entry and a remove writer entry.

26. The system as claimed in claim 25, wherein the processor is further responsive to the instructions to consult the first writer queue for the presence of a new payload if (i) the entry type is a dummy entry and (ii) the time is appropriate for processing the entry whose entry number is associated with the dummy entry because the entry having an immediately preceding entry number has been processed.

* * * * *